(12) United States Patent
Ludwig

(10) Patent No.: US 8,763,806 B2
(45) Date of Patent: Jul. 1, 2014

(54) TWO COMPONENT VERTICAL SEALING BLISTER PACKAGING

(75) Inventor: Giaia Lee Ludwig, Geneva, IL (US)

(73) Assignee: Tegrant Alloyd Brands, Inc., Dekalb, IL (US)

( * ) Notice: Subject to any disclaimer, the term of this patent is extended or adjusted under 35 U.S.C. 154(b) by 0 days.

(21) Appl. No.: 13/274,097

(22) Filed: Oct. 14, 2011

(65) Prior Publication Data
US 2012/0031908 A1 Feb. 9, 2012

Related U.S. Application Data

(63) Continuation of application No. 12/635,189, filed on Dec. 10, 2009.

(51) Int. Cl.
*B65D 73/00* (2006.01)

(52) U.S. Cl.
USPC .......................................... 206/461; 206/467

(58) Field of Classification Search
USPC ......... 206/461, 501, 502, 499, 217, 203, 467; 229/115, 904, 908, 108; 426/129
See application file for complete search history.

(56) References Cited

U.S. PATENT DOCUMENTS

| | | | | |
|---|---|---|---|---|
| 1,803,566 A * | 5/1931 | Sexton | ........................... | 206/508 |
| 2,814,381 A * | 11/1957 | Stevick | ........................ | 426/129 |
| 2,937,746 A | 5/1960 | Ferguson | | |
| 3,358,819 A * | 12/1967 | Johnson | ........................ | 206/756 |
| 3,498,018 A * | 3/1970 | Gifford et al. | .................. | 53/433 |
| 3,590,988 A * | 7/1971 | Hollar | ........................... | 206/776 |
| 3,707,274 A | 12/1972 | Hausler et al. | | |
| 3,734,276 A * | 5/1973 | Bank | ............................ | 206/232 |
| 4,183,458 A | 1/1980 | Meyers | | |
| 4,199,058 A * | 4/1980 | Lense et al. | .................... | 206/756 |
| 4,415,084 A | 11/1983 | Hauser et al. | | |
| 4,498,589 A | 2/1985 | Scott et al. | | |
| 4,619,364 A | 10/1986 | Czopor, Jr. | | |
| 4,962,849 A * | 10/1990 | Anderson | .................. | 206/45.24 |
| 5,129,517 A * | 7/1992 | Hustad | ........................ | 206/467 |
| 5,209,354 A | 5/1993 | Thornhill et al. | | |
| 5,514,392 A | 5/1996 | Garwood | | |
| 5,522,505 A | 6/1996 | Giovannone | | |
| 5,564,569 A | 10/1996 | Kiefer | | |
| 5,582,317 A | 12/1996 | Wermund | | |
| 6,170,663 B1 | 1/2001 | Glassman | | |
| 6,237,772 B1 * | 5/2001 | LaMarche et al. | ............ | 206/470 |
| 6,739,109 B1 | 5/2004 | Fan | | |
| 6,793,078 B2 | 9/2004 | Roshdy | | |
| 6,932,753 B1 | 8/2005 | Smith et al. | | |

(Continued)

OTHER PUBLICATIONS

Medical Device Link Retrieved from Retrieved from http://www.devicelink.com/grabber.php3?URL=hppt://www.devicelink.com/mddi/archive/ . . . On May 20, 2009 6 pages.

*Primary Examiner* — Luan K Bui
*Assistant Examiner* — Rafael Ortiz
(74) *Attorney, Agent, or Firm* — Dorsey & Whitney LLP

(57) ABSTRACT

A container comprises a plastic blister or cover component with a first peripheral edge and a formed, first open-sided volume extending from the peripheral edge joined with a paperboard tray or tray component with a second peripheral edge, the paperboard tray or tray component having a plurality of panels forming a second open-sided volume. The container has means for joining the first peripheral edge of the plastic blister or cover component and the second peripheral edge of the paperboard tray or tray component so that the first and second volumes form a combined container volume.

23 Claims, 13 Drawing Sheets

(56) References Cited

U.S. PATENT DOCUMENTS

| | | | |
|---|---|---|---|
| 7,204,069 B2 | 4/2007 | Liao | |
| 7,213,703 B2 | 5/2007 | Begim | |
| 7,353,948 B1 | 4/2008 | McDonald | |
| 7,475,779 B2 | 1/2009 | Kellar et al. | |
| 7,644,744 B2 | 1/2010 | Fan | |
| D624,402 S * | 9/2010 | Hansen et al. | D9/426 |
| 7,931,148 B2 * | 4/2011 | Hansen et al. | 206/470 |
| 2002/0037795 A1 | 3/2002 | Tachikawa et al. | |
| 2002/0189964 A1 | 12/2002 | Mazurek | |
| 2004/0040880 A1 | 3/2004 | Grosskopf | |
| 2005/0133398 A1 | 6/2005 | Schwester | |
| 2006/0091037 A1 | 5/2006 | Grote et al. | |
| 2006/0113215 A1 * | 6/2006 | Clements et al. | 206/779 |
| 2006/0260973 A1 | 11/2006 | Macinnes et al. | |
| 2007/0023310 A1 * | 2/2007 | Davis | 206/457 |
| 2007/0029223 A1 | 2/2007 | Mazurek | |
| 2007/0114154 A1 | 5/2007 | Ritter | |
| 2007/0125678 A1 | 6/2007 | Green | |
| 2007/0256951 A1 | 11/2007 | O'Keefe | |
| 2008/0000794 A1 | 1/2008 | Aldridge | |
| 2008/0029417 A1 | 2/2008 | Begim | |
| 2008/0142393 A1 | 6/2008 | Grosskopf | |
| 2008/0173564 A1 | 7/2008 | Aldridge et al. | |
| 2008/0272020 A1 | 11/2008 | Aldridge | |
| 2008/0308445 A1 | 12/2008 | Dolak | |
| 2009/0272664 A1 | 11/2009 | Marshall et al. | |
| 2010/0170821 A1 | 7/2010 | Grosskopf | |

* cited by examiner

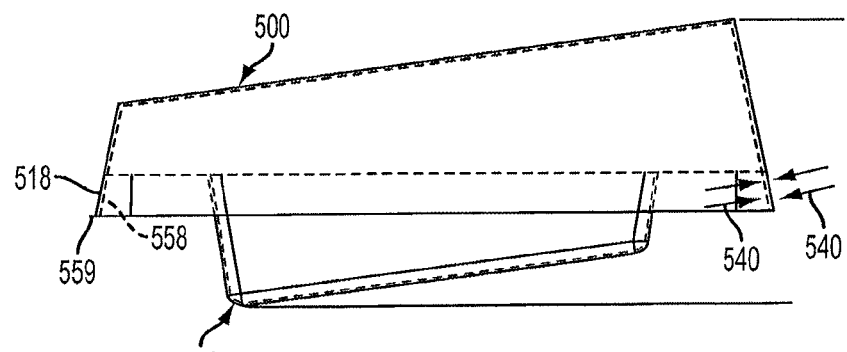
FIG. 5A
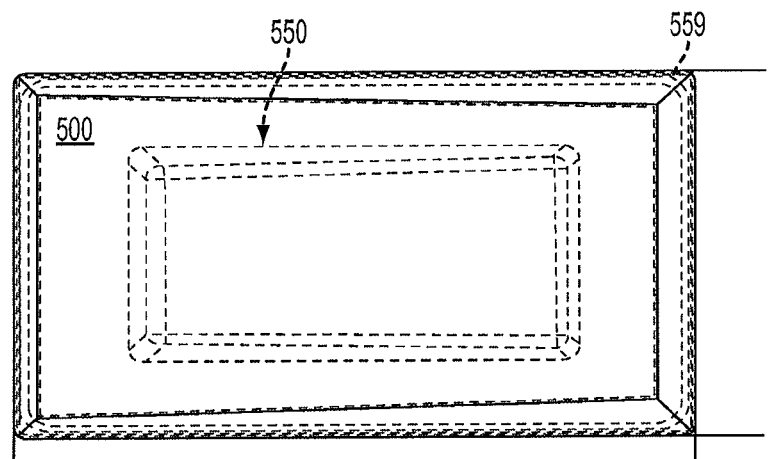
FIG. 5B
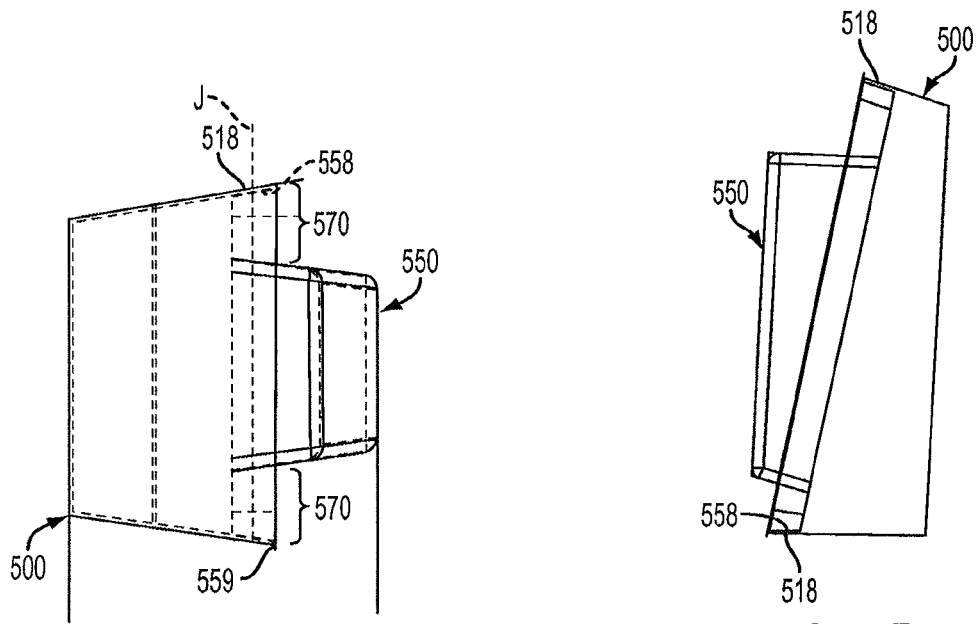
FIG. 5C
FIG. 5D

TWO COMPONENT VERTICAL SEALING BLISTER PACKAGING

This application is a continuation of U.S. patent application Ser. No. 12/635,189, pending filed Dec. 10, 2009, the content of which is hereby incorporated in its entirety by reference.

FIELD OF THE INVENTION

The present disclosure relates to product packaging. More particularly, the present disclosure relates to an improved blister packaging container formed from a paperboard tray to which a mating element is joined.

BACKGROUND

Various packaging containers and methods are currently in commercial use. For example, it is known to use "clamshell" packaging and "blister" packaging for enclosing various products and carrying or containing associated product information. Blister packaging generally comprises a transparent, concave plastic housing or "blister" that is attached to a generally flat paperboard backing or card. The "blister" forms a concave volume for holding products and typically has a peripheral edge or flange that is fully sealed to the backing and provides stiffness to the blister card. The blister, which confines the packaged product, bulges out from the flat paperboard surface. To open the package, the purchaser breaks the seal between the blister and the paperboard backing or makes an opening in the paperboard backing or in the plastic blister. Where the blister is made from transparent plastic, the enclosed product is largely visible, and inserts made of paper and other materials may be placed in the packaging to describe or label the goods or provide instructions. The paperboard backing also serves as a substrate for graphics and/or printed product information.

Clamshell packaging is made from two concave plastic housings or halves that are usually joined at some form of hinge. Such packages may be openable and reclosable in some fashion, although a seal of some kind may be used to deter opening until after purchase or for tamper evidence. "Permanently" sealed clamshell packaging is also available. This is generally formed from two clear plastic "bubble" housings that may be formed, either joined at a hinge edge or completely separate. After product insertion, the two housings are sealed together at mating edges through various means, such as radio frequency, sonic vibrations or electrical resistance, used to heat or weld. The permanently sealed packaging generally has to be cut or broken in one or both of the halves in order to access the product. In a clamshell package that is not permanently sealed, the user may access product by breaking a paper or other seal strip or separating a locking structure at the package edge and hinging open the two halves of the shell.

Blister and clamshell packaging have become popular, in part, because they provide product visibility but also because they help deter product theft and tampering. Smaller, high value items are often shoplifting targets, because they are easily pocketed. Placing the small product in a blister package that is too large for easy pocketing helps deter theft. Smaller, high value items in easily opened packages are also subject to tampering or switching. A well-sealed blister package can also deter such behavior or at least provide tamper evidence.

However, there are several drawbacks associated with the use of conventional blister packaging. The transparent plastic compartment permits product viewing, but its attachment to the paperboard card generally only permits product display by hanging from a hole or notch; the packaged product will usually not stand stably on its own for product display. To the extent the plastic blister defines most of the product-containing volume, this plastic material may be viewed as less eco-friendly than a paperboard package. Further, the flat paperboard backing limits the possible geometric configurations in such a container largely to the shape of the plastic blister, and the package efficiently uses the package volume only when the product has a least one major flat surface. This may limit the size of the product that may be placed in such a container, or increase the amount of plastic required to contain larger products. Furthermore, as the paperboard is always flat, the plastic blister represents the only opportunity to adapt the package to a product shape that is not flat; thus, a new thermoform mold may be required for different product sizes and shapes.

Clamshell packages have disadvantages too. The processes for placing an insert inside and for sealing the clamshell together are generally expensive and time consuming. Furthermore, such sealed, all-plastic clamshells also tend to be harder to open by the consumer (after purchase) than other varieties of packaging. Such plastic packaging is typically rigid, whereby a knife or scissors being used to open the package by penetrating the plastic blister may bounce or slip off the package and cut or otherwise injure the consumer. When cut open, the plastic housing often has sharp edges that may pose a risk to the consumer. Furthermore, the plastic housing is often not easily recyclable and may be viewed as less environmentally friendly than a package of paperboard.

Because blister packaging using flat paperboard cards has become highly popular, there is a significant installed base of equipment for component feeding, loading, assembly and sealing such packaging. Much of this equipment has multiple stations where tooling specific to the package may be installed, to perform the steps of introducing package components, loading product and effecting sealing. It would be beneficial to expand the range of packaging that can be handled by such machines with minimal tooling changes.

What is needed is an improved blister package. It is preferably one that can be filled and sealed on existing blister packaging equipment with no changes in equipment or simple, standard tooling changes.

SUMMARY

Accordingly, an object of the present disclosure is to provide an improved blister packaging container and method. In one embodiment described herein, a container comprises a plastic blister with a first planar peripheral edge and a formed, first open-sided volume extending from the plane of the peripheral edge; a paperboard tray with a second planar peripheral edge, the paperboard tray having a plurality of panels connected at fold lines and forming a second open-sided volume; and means for joining the first planar peripheral edge of the plastic blister and the second planar peripheral edge of the paperboard tray so that the first and second volumes form a combined container volume. Alternative embodiments may have a configuration wherein the peripheral edge is provided on more than one plane.

In another embodiment described herein, a method of making a container comprises providing a plastic blister with a first, planar peripheral edge and a formed, first, open-sided volume extending from the plane of the peripheral edge; forming a paperboard tray with a planar peripheral edge, the paperboard tray having a plurality of panels connected at fold lines and forming a second, open; sided volume; and joining the first planar peripheral edge of the plastic blister and the second planar peripheral edge of the paperboard tray so that the first and second, volumes form a combined container volume.

In a further embodiment described herein, a container comprises a cover with a first planar peripheral edge and a formed, first open-sided volume extending from the plane of the peripheral edge; a paperboard tray with a second planar peripheral edge, the paperboard tray having a plurality of panels connected at fold lines to form a wedge-shaped tray with a second open-sided volume with greater depth at one end than at the other end; and means for joining the first planar peripheral edge of the plastic blister and the second planar peripheral edge of the paperboard tray so that the first and second volumes form a combined container volume.

A further embodiment is a tool set for use in forming a container comprising a plastic blister with a first peripheral edge and a formed, first open-sided volume extending from the peripheral edge joined with a paperboard tray with a second peripheral edge bearing heat seal material, where the paperboard tray has a plurality of panels connected at fold lines to form a wedge-shaped tray with a second open-sided volume with greater depth at one end than at the other end. The tool set comprises: a nest for receiving one of said plastic blister and paperboard tray and holding it while product is loaded and the other of said plastic blister and paperboard tray is placed to form a combined volume; guides attached to the nest for supporting and holding in overlapping alignment the respective peripheral edges of said plastic blister and paperboard tray, the overlapping peripheral edges being oriented generally parallel to an axis defining the depth of the respective volumes in the plastic blister and paperboard tray; and a heating tool for application to at least a portion of the overlapping peripheral edges of said plastic blister and paperboard tray to activate the heat seal material.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the spirit and scope of the present disclosure. Accordingly, the drawings and detailed description are to be regarded as illustrative in nature and not restrictive. Particularly, drawings are provided which depict embodiments of a particular shape. It will be understood that these drawing are meant merely to illustrate example shapes, and many other shapes will be possible, all within the scope of the present disclosure.

BRIEF DESCRIPTION OF THE FIGURES

FIG. 5A is a side view of a plastic blister with a peripheral "vertical" sealing surface, joined with a paperboard tray with a complementary peripheral "vertical" sealing surface.

FIG. 5B is a plan view of the package of FIG. 5A, taken from the side of the paperboard tray, showing the plastic blister in dashed lines.

FIG. 5C is an end view of the package of FIGS. 5A-5B.

FIG. 5D is a side view of the package of FIGS. 5A-5C, standing on one end.

DETAILED DESCRIPTION

Overview.

Figure 1A:
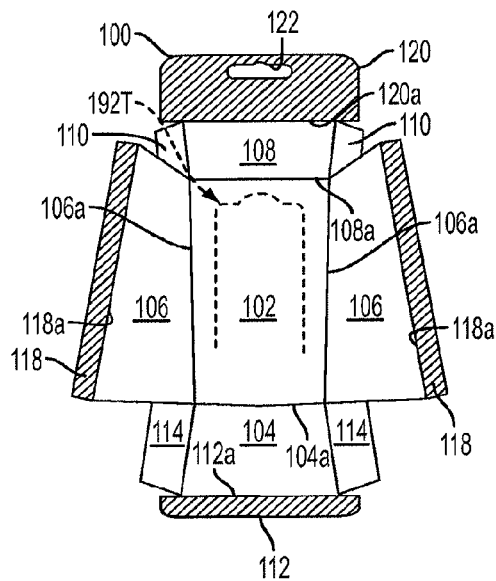
FIG. 1A is a plan view of a paperboard blank for a generally wedge-shaped tray prior to being formed into a tray in accordance with one embodiment.
Figure 1B:
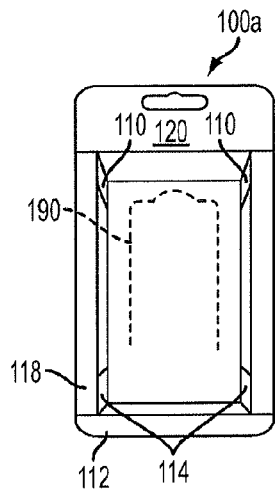
FIG. 1B is a top view of a paperboard blank as in FIG. 1A after being formed into a tray but prior to being sealed together with a plastic blister in accordance with one embodiment.
Figure 1C:
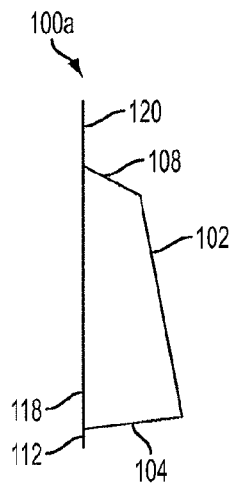
FIG. 1C is a side view of a paperboard blank as in FIG. 1A after being formed into a tray as in FIG. 1B.
Figure 1D:
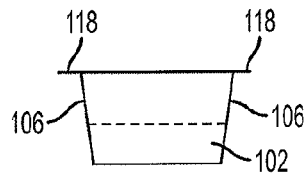
FIG. 1D is an end view of a paperboard blank as in FIG. 1A after being formed into a tray as in FIG. 1B
Figure 1E:
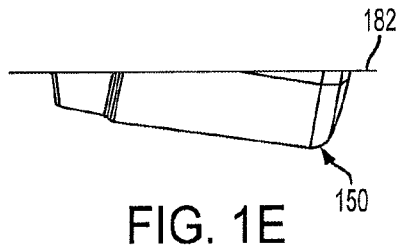
FIG. 1E is a side view of a thermoformed plastic blister prior to being sealed together with a paperboard tray in accordance with one embodiment.
Figure 1F:
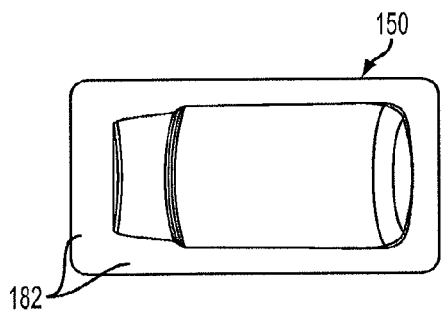
FIG. 1F is a plan view of the thermoformed plastic blister of FIG. 1E prior to being sealed together with a paperboard tray in accordance with one embodiment.
Figure 1G:
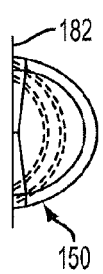
FIG. 1G is an end view of a thermoformed plastic blister of FIG. 1E prior to being sealed together with a paperboard tray in accordance with one embodiment.
Figure 1H:
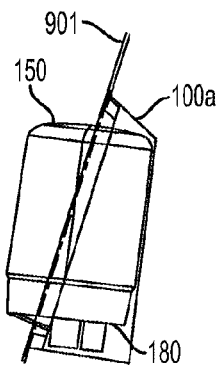
FIG. 1H is a side view of the thermoformed plastic blister of FIGS. 1E-1G sealed together with a paperboard tray of FIGS. 1B-1D in accordance with one embodiment.

Referring now to the drawings, and in particular FIG. 1H, one embodiment of a blister packaging container is shown. It is formed from a folded paperboard tray 100a that defines an open-sided concave volume joined with a formed, transparent, plastic "blister" 150 that also defines an open-sided, concave volume, to together define a combined container volume. The paperboard tray 100a has a planar, peripheral flange along its circumference. In the embodiment shown, the circumference comprises four sides of a rectangle (see FIG. 1B). The transparent "blister" (or bubble) 150 has a planar, peripheral flange along its circumference, in this embodiment the four sides of a rectangle with rounded corners (see FIG. 1F). Each of the two concave volumes extends out of the plane of its associated peripheral edge and is in a mating relationship with the other volume to form a combined container volume into which a product (e.g., a generally cylindrical item 180 shown in FIG. 1H) may be inserted, before the respective blister and tray flanges are joined and partially or wholly sealed. The product may be a house-ware or health and beauty product, an electronic or other component, or any of a wide variety of products for which it is desirable that the purchaser be able to see all or most of the product at the point of purchase and for which sealed packaging is desired. The container includes means for joining the planar peripheral edge of the plastic blister and the planar peripheral edge of the paperboard tray, so that the first and second volumes form the combined container volume. The means for joining may include various heat-activated sealing materials (activated by contact with heated plates or directed radio frequency radiation or other known heating means), but may also include a bond formed with adhesives, glues, and various means for radio frequency or ultrasonic welding or otherwise joining two surfaces.

Paperboard Tray.

The present packaging designs add versatility to a conventional blister package made with a flat paperboard card, with a formed plastic blister providing a first open-sided volume for enclosing product. Here, the paperboard card is replaced with a paperboard tray, providing a second, concave volume that augments or cooperates with the first volume of the plastic blister. Yet the package can be assembled on the same equipment (with minor tooling changes) as a conventional blister package made with a flat paperboard card. The paperboard tray may be formed into its concave shape from a flat blank. Unlike conventional paperboard cards used in most blister packaging, the tray is not just a flat surface but is designed to have an open-sided volume; thus it is akin to the open-sided volume of a plastic blister of a conventional blister package and may provide a significant part of the volume occupied by the packaged product.

Referring now to the drawings, and in particular FIG. 1A, there is shown as one example a paperboard tray blank 100, which may be cut from paperboard or other suitable paper-based material, for forming a paper carton or tray to be used in a commercially available blister packaging machine, such as the Aergo 8 from Tegrant Corporation, Alloyd Brands of DeKalb, Ill. Exemplary paperboard material may be SBS board, including SBS Blister Card Stock, printed at Tegrant Corporation, Alloyd Brands. (The following discussion will use the phrases paperboard tray (or blank) and paper tray (or blank) alternatively, because this distinction is largely a matter of weight, thickness, flexibility and strength of the paper-based material. As will be seen, the invention is applicable to various paper-based materials capable of forming the tray components shown. Thus, the phrases refer to any paper-based materials with weight and other qualities suitable for the particular container application.) The paperboard blank 100 may be printed on, like a regular blister card, and coated on one or both sides with a heat seal coating. The blank 100 may be impregnated or coated on one or more sides with other coatings that resist oils, heat or moisture, such that the container may be adapted for use with wet or oily products. Suitable heat seal coatings (such as, aqueous or EVA heat seal coating) or other blister-rated heat seal coatings for various packaging applications are commercially available from Henkel Corporation of Duesseldorf, Germany, Sun Chemical Corporation of Northlake, Ill., ACTEGA Kelstar, Inc. of Cinnaminson, N.J. and others, and will be familiar to those skilled in the art.

In order to create the blister card blank as depicted in FIG. 1A, a continuous web or a preprinted sheet of heat-seal coated paperboard or other material may be die-cut to the desired shape, stripped or scored, and the resulting blanks stacked. It will be recognized that the blanks may be die-cut and scored with fold lines for many suitable configurations that can be erected to form a tray with a concave volume. As seen in FIG. 1A, in one embodiment, the blank 100 may include a bottom panel 102 (with a perforated tear opening 192), a first end panel 104, opposed side panels 106, a second end panel 108, corner seal flaps 110 adjacent one edge of each side panel 106 (or 108), further corner seal flaps 114 at opposed edges of first end panel 104 (or 106), an end-flange flap 112, a pair of side flange flaps 118 and hanger panel 120 with hanger hole 122. Fold lines 104a, 106a, 106a, 108a join panels 104, 106, 106, 108 to the bottom panel 102. Fold lines 112a, 118a, 118a, 120a join flaps 112, 118, 118, 120, respectively, to their respective adjacent panels 104, 106, 106, 108. The panel and flap shapes and fold lines shown in FIG. 1A are suitable to produce a wedge-shaped tray, with greater depth at the end adjacent first end panel 104 than at the end adjacent second end panel 108. Other panel and flap configurations to create a different desired tray shape or flange configuration are considered to be within the scope and spirit of this disclosure. For example, the tray might be more like a rectangular or square box of constant depth or might have a trapezoidal or triangular bottom panel, with suitable corner seal flaps and edge flange flaps to form a walled paper tray.

Once die cut, the blister card blanks may proceed to a carton forming machine, wherein the blanks are folded to the desired configuration and sealingly joined together into a paper tray 100a, as shown at FIGS. 1B-1D. When one or both surfaces of the blank 100 (FIG. 1A) have been coated with a suitable heat seal layer, no glue or adhesive need be introduced when the trays are erected from a blank. Forming the erected tray may be accomplished by, for example, heat sealing techniques that join flaps folded to lie adjacent one another, wherein a hot member of the carton forming machine contacts one or both corner seal flaps and applies pressure, thus sealing together the adjacent surfaces. (Other glue or adhesive means of joining flaps will also be known to those skilled in the art.) It should be noted that when the segments of 112, 118, 118, 120 forming the sealing flange of a formed paper tray are treated with a heat seal coating that is compatible with a thermoformed plastic blister, the erected tray 100a is ready to be joined with a thermoformed plastic blister with a mating set of peripheral flanges at the product filling and sealing stage of the packaging process.

One characteristic of some embodiments of the present disclosure is that the formed paperboard trays 100a, as depicted in FIGS. 1B-1D, have a generally concave shape with a varying tray depth as one moves from end panel 104 to end panel 108. This shape provides various improvements over existing packaging containers, which include but are not limited to, increased interior volume, improved storage characteristics for uses wherein a product is sealed inside for later use, and improved handling of multiple packages for shipping. In the particular embodiment shown in FIGS. 1A-1D, the tray 100a is deeper at one end than at the other, because flap 104 is longer than flap 108. As best seen in the side view in FIG. 1C, this gives the tray 100a a wedge shape.

Figure 7A:
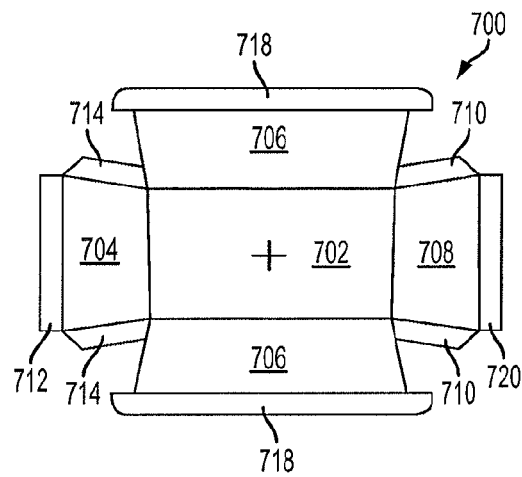
FIG. 7A is a plan view of a blank for a paperboard tray having a flat bottom and a generally rectangular box configuration in accordance with one embodiment.
Figure 7B:
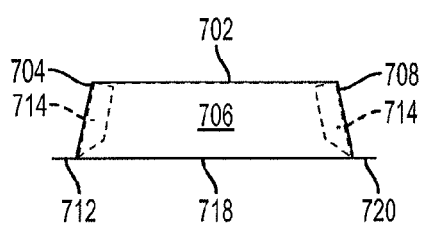
FIG. 7B is a side view of a paperboard tray erected from a blank as in FIG. 7A.
Figure 7C:
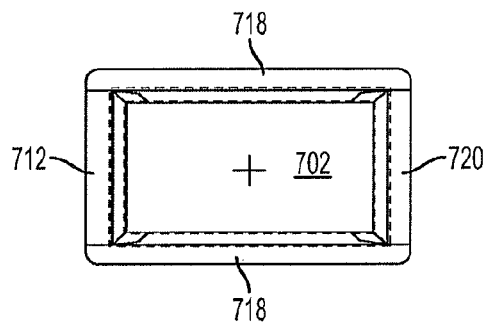
FIG. 7C is top view of a paperboard tray erected from a blank as in FIG. 7A.
Figure 7D:
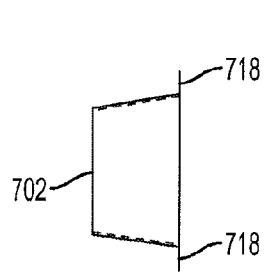
FIG. 7D is an end view of a paperboard tray erected from a blank as in FIG. 7A.
Figure 7E:
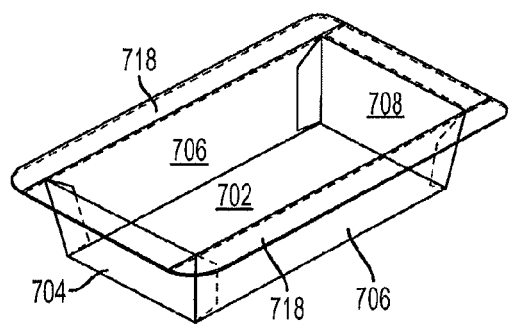
FIG. 7E is a perspective view of a paperboard tray erected from a blank as in FIG. 7A.

In another embodiment, the paperboard tray has substantially the same depth at all points. As seen in FIG. 7A, a blank 700 for a tray having a generally flat bottom side 702 is depicted wherein the width of the side panels 706 is constant along the length of the bottom panel 702, and the width of end panels 704, 708 is equal. As seen in FIG. 7B, when folded so that flaps 714 and 710 are used to join corners, the result is a formed tray having a flat bottom and constant depth configuration. Flaps 712, 718, 718 and 720 form the rectangular peripheral flange of the resulting tray. FIGS. 7C-7E depict top, end and perspective views of an embodiment of a paper tray fully assembled from the blank shown in FIG. 7A.

Plastic Blister.

FIGS. 1E-1G depict an exemplary formed plastic display blister 150. The blister 150 may be thermoformed and may be produced preferably from any known plastic or plastic like material having suitable durability, formability and other qualities for the desired application. For example, suitable materials are polyvinyl chloride, polychlorotrifluoro ethylene, polypropylene, polyethylene, or other cyclic olefin copolymers. Other suitable plastic or plastic-like materials will be known to those skilled in the art. The blister 150 may be produced in a known manner by placing the plastic into a forming die (not shown) under heat and pressure. The die may cause the plastic blister to closely approximate the outer shape of the product or products to be packaged. The thermoformed blister 150 design incorporates a peripheral (circumferential) flange 182 disposed generally on the periphery of the blister 150. The flange 182 may be shaped in such manner as to correspond to the flanges of a paper tray 100a (FIGS. 1B-1D) to which it may be joined and sealed in the product packaging process.

Although the blister of FIGS. 1E-1G defines an open-sided volume generally in the shape of a half cylinder, it will be understood that this volume may be of any thermoformable shape. For example, it may be a rectangular box, part-conical volume, a box topped by a simple or a complex geometric shape to conform closely to certain surfaces of an irregularly-shaped product to be contained in the packaging, so long as the flange 182 permits mating to and sealing with the flange (made up of edge flanges 112, 118, 118, 120) of the corresponding tray 100a. In general, the plastic blister 150 is shaped and sized to be complementary to the concave volume of the paper tray described above and to which it is joined. When it is not joined to a flat card, the plastic blister no longer has the burden of providing the full volume for the packaged object(s).

With reference to FIG. 1H, one function of the plastic blister 150 in some embodiments is to hold a contained item 180 in position within the package. This is accomplished by having at least an outer portion of the blister 150 have a shape that mates with the exterior surface features of the packaged item. For example, the outer portion in FIG. 1H mates with a cylindrical product surface. Packaging of an item that has an irregular member protruding outwardly may be accommodated by thermoforming the plastic blister with a bulge (in addition to the regular concavity) corresponding to the location of the irregular, protruding member. Likewise, for a contained product with an intrusion, the plastic blister may be formed to conform to the intrusion.

Completed Package.

Once both the paper tray 100a of FIGS. 1B-1D and the thermoformed plastic blister 150 of FIGS. 1E-1G have been produced, these components may be filled with product and sealed together as in FIG. 1H. This sealing may occur in the same machine that formed the paper tray 100a, or it may occur in a separate machine specifically adapted for the component feeding, filling and sealing procedure. Such a machine is provided a supply of erected paper trays (usually in the form of a nested stack) and a supply of plastic blisters with flanges to mate with those of the paper tray. When the flanges of the paper trays are already coated with heat seal material, the mating flanges may be joined as soon as the product is inserted and the mating peripheral flanges are aligned. The machine may apply heat at an appropriate level to the flanges of the paper tray 100a, activating the heat seal coating to form a bond for joining the two components. Pressure may then be applied to join the flanges of the paper tray 100a and the thermoformed plastic blister 150. Suitable amounts of heat and pressure will be determined by several variables, including type of heat seal coating and/or adhesive, size of packaging, and strength of bond and seal desired, among others.

Figure 2A:
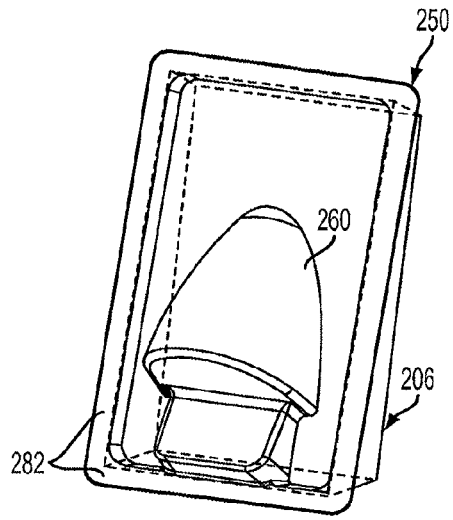
FIG. 2A is a transparent pictorial view of a blister packaging container in accordance with one embodiment, for containing a generally wedge-shaped product.

FIGS. 2A-2D show another embodiment of the container, adapted to hold a product that is not cylindrical. As seen in FIG. 2A, the plastic blister 250 has a first, open-sided volume 270 that is adapted to conform to a generally wedge-shaped product (not shown) and a peripheral flange 282. The corresponding paperboard wedge tray 200 varies in depth, and has a peripheral flange 212; that is second, open-sided volume 230 of the wedge tray is complementary to the first, open-sided volume 270. The two volumes 230, 270 form a combined volume that accommodates the size and specific shape of the product to be contained (not shown in FIGS. 2A-2D).

Figure 3:
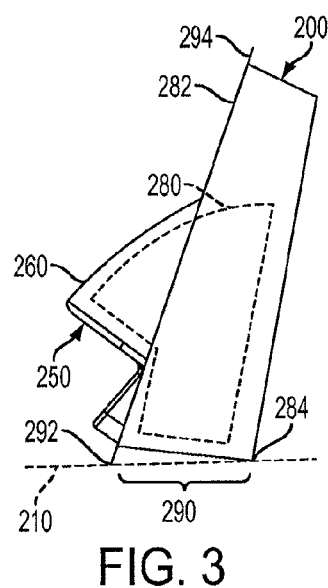
FIG. 3 is a side view of a blister packaging container as in FIG. 2A showing it standing on a horizontal surface.

With respect to embodiments where the paper tray is configured into a wedge shape, it will be appreciated that one particular advantage of this design is that a package with a stable base for standing the package results. As best seen in FIG. 3, a product 280 may be placed in the wedge-shaped paper tray 200, which is joined with a plastic blister 250 with a product-complementary shape defined by its outermost surface 260. As seen in FIG. 3, the resulting container has a first support at first base edge 292 where the flanges of the paper tray 200 and a plastic blister 250 come together and a second support at a second base edge 284, spaced from the first support, located at the fold line where the end panel and the bottom panel of the paper tray 200 are joined. These form the support points for a stand-up base 290. Depending on how the edges or fold lines are formed, for stability, at least one of the first or second supports is preferably at a line (although support also may comprise two or more discrete points of a line, such as projections from an edge). The other support may be at a line or a point. More generally, there can be a support made by any two points on one line, joined by a third point that is sufficiently separate from the line. Thus, if the packaging is set upright with the base 290 facing downward (e.g., on an in-store display shelf, as indicated by a dotted line 210 in FIG. 3), at least three spaced points or a point and a line spaced therefrom define a stand-up base contacting the shelf 210, and the center of gravity will be lower along the vertical axis of the length of the packaging than the mid-point between the base 290 and the top edge 294. Such lowered center of gravity contributes to the stability of the container when set out on a display shelf, rather than being hung on a rack or a hook. Further, with two supports, provided by two straight edges 292, 284 in one plane, forming the base 290, the wedge tray design contributes to lateral stability of the container, due again to the lowered center of gravity and the significant spacing (here separated by the depth of the wedge tray at its deeper edge) of the lines of contact with a display shelf 210 on which base 290 sits.

Figure 4A:
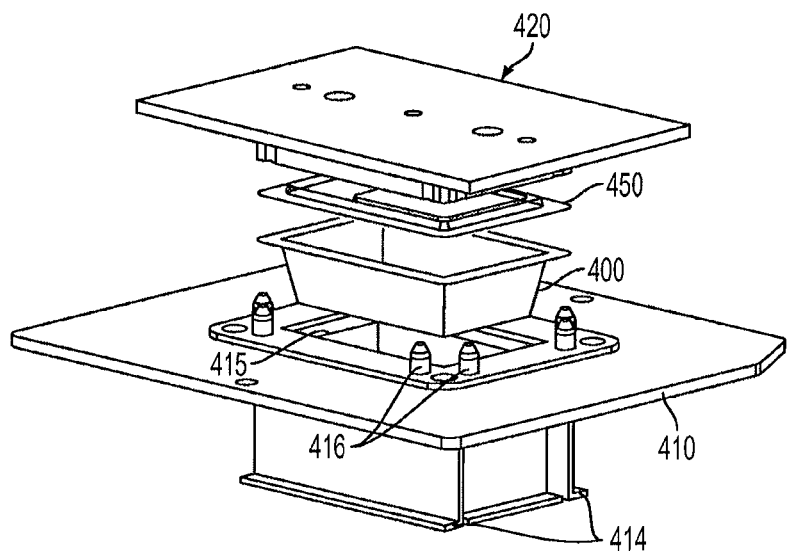
FIGS. 4A-4C depict an exploded pictorial view and related plan and cross-sectional (along line B-B of FIG. 4B) views, respectively, of tooling used with equipment as in FIGS. 11A-11B for holding and sealing components for a container made from a plastic blister and a paperboard tray as shown.
Figure 4B:
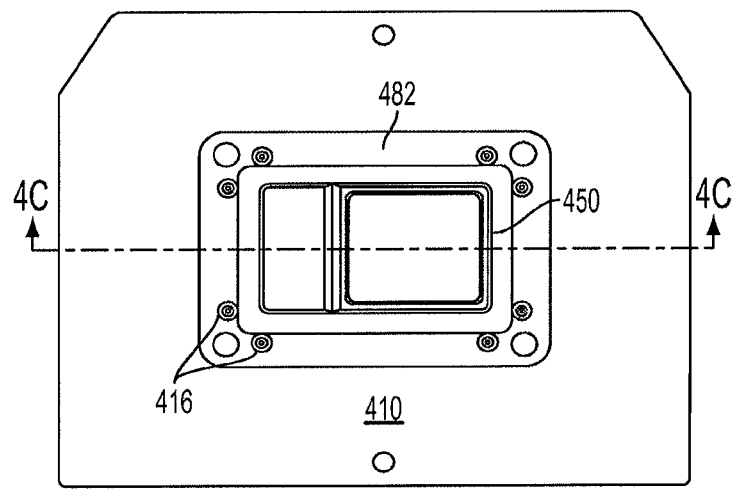
Figure 4C:
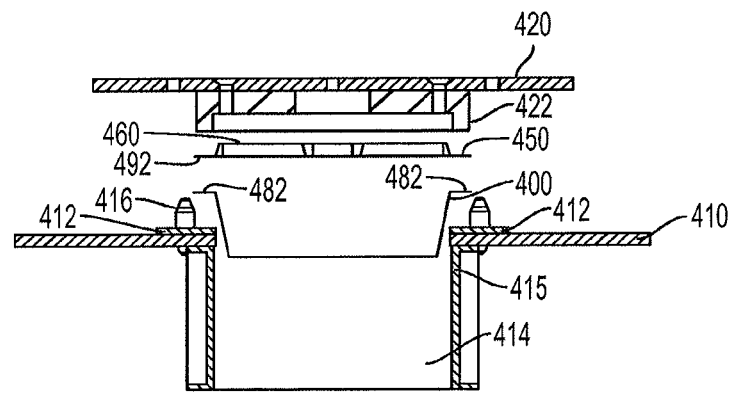

FIGS. 4A-4C show an exploded pictorial view and related plan and cross-sectional (along line B-B of FIG. 4B) views of tooling for a conventional blister card assembly and sealing machine adapted to provide a sealing station for a paperboard tray as described above, instead of a flat paperboard card. As seen in FIG. 4A-4C, support channels 414, 415 extending downward from a plate 410 are used to receive a paperboard tray 400. The side flanges 482 of the tray 400 rest on a peripheral gasket 412, and the plate 410 in turn rests on the support channels 414, 415. (The exploded views of FIGS. 4A and 4B show the tray 400 above the channels 414, 415, gasket 412 and plate 410 where it will rest for sealing.) The tray 400 spans between the two side channels 415 and is guided into its sealing position by corner pins 416.

FIG. 4C shows an end view of the tray 400 at a sealing station. Here the tray 400 is shown just above its rest position sitting in the support channels 414, 415 and spans between the opposed sides. A plastic blister 450 with a shallow convex volume 460 extending upward from the plane of flange 492 is shown positioned above tray 400, ready to be lowered (as seen in FIG. 4C), guided by pins 416, to mate its peripheral flange 492 with the peripheral flange 482 of the tray 400, so that sealing may be performed. At the edges of the support channels 414, 415, this sealing may be provided by heat/pressure plate assembly 420 with edge elements 422 that are lowered (as seen in FIG. 4C) to apply heat/pressure to activate the heat seal material and form the means for joining the plastic blister 450 and the paperboard tray 400 at their respective mating flanges 492, 482. If a seal along the entire peripheral edge is desired (as for tamper evidence or when small articles are packaged), the heat/pressure elements are applied around the entire periphery of the paperboard tray 400 and blister 450, with the gasket 412 on the plate 410 resisting the downward pressure of the heat/pressure elements. To make a partial seal, the heat/pressure elements are interrupted at portions of the periphery of the tray 400. Once the surfaces to be sealed are sufficiently heated and pressed to form the desired bond and/or seal, the finished package can be transported from the sealing station.

Figure 14A:
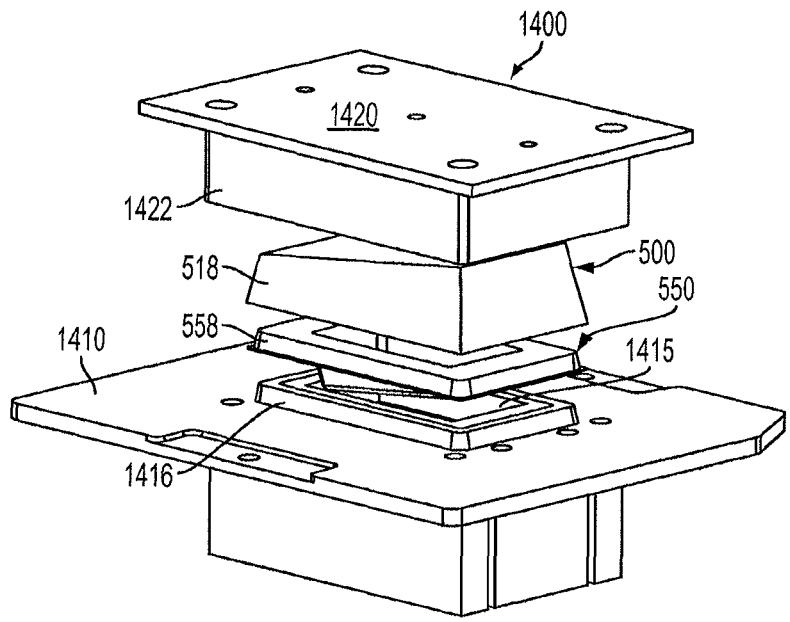
FIGS. 14A-14C depict an exploded perspective view and related plan and cross-sectional (taken along line B-B of FIG. 14B) views, respectively, of tooling used with equipment as in FIGS. 11A-11B for holding and sealing components for a container as shown in FIGS. 5A-5D
Figure 14B:
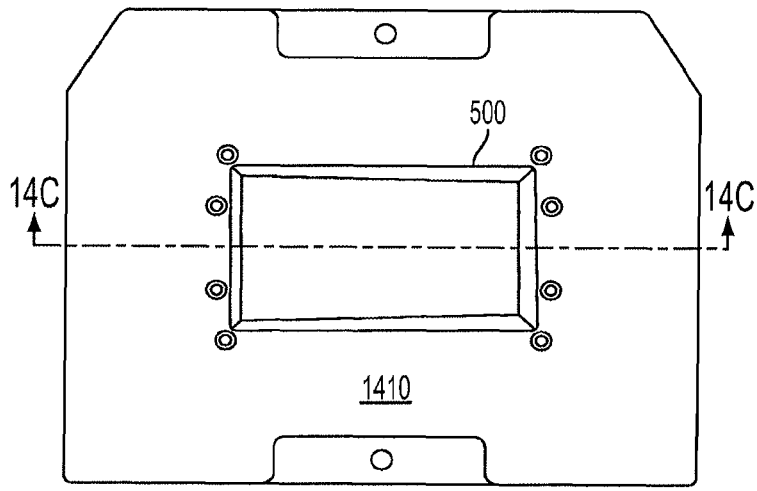
Figure 14C:
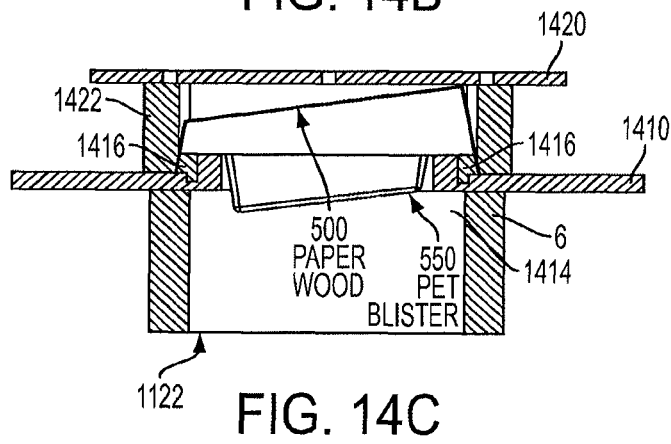

Because conventional blister card loading-sealing machinery is often configured with tooling that is essentially the same as support channels 414, 415 and plate 410, with the exception that the plastic blister is placed open upward and receives a paperboard card applied from above, the conventional heat sealing machinery is easily adapted to use the formed paper tray and complementary plastic blister either as shown in FIGS. 4A-4C, or with a heat/pressure plate 420 with more headroom to accommodate a plastic blister or paper tray with a greater product-containing volume, such as in FIGS. 1E-1H or FIGS. 2A-2D. The heat and pressure for heat sealing are applied in the same plane as if a flat card had been applied to a plastic blister. Although FIGS. 4A-4C show the paper tray 400 placed first, which means the product is loaded into the paper tray 400, a plastic blister (typically more concave than the one shown in FIGS. 4A-4C) can be placed first, then loaded with product. (FIGS. 14A-14C show an example of tooling that contemplates the plastic blister will be placed first.)

As can be seen, referring again to FIG. 3, the peripheral edge and flange 282 of the plastic blister 250 is joined to the peripheral edge and flange 212 of the paperboard tray 200. The resulting package has a stand-up base 290 defined by the lower edge 292 where the peripheral flanges 282 and 212 are joined and by the fold line forming the lower back edge 284 of the tray 200. Thus, while the package, if provided with a hanger hole 122 as in FIG. 1A-1B, can hang from a rod, it can also stand on base 290 on a shelf. It also may be placed in ranks with bases 290 contacting the bottom of a packing carton with a number of other such packages and will remain stable in the location and position where it was placed.

A blister packaging container such as the ones depicted in FIGS. 1H and 2A and produced by the described method will realize various other advantages over existing packaging containers. For example, in some embodiments, perforation cut 192 (see FIG. 1A) or opening tab, comprising perforations in a surface of the paperboard tray forming a tear opening of the container, may be added to the tray bottom panel 102 (see FIG. 1A), such that opening the container may be safer and easier for the consumer. In other embodiments, printing on any or all of the surfaces inside and outside of the tray may help eliminate the need in some applications for additional instruction sheets or additional printed inserts, thus reducing the overall package and package assembly cost. Other advantages include using less plastic, which may be beneficial to the environment, as less non-recyclable waste will be discarded after the container has been opened by the consumer. Furthermore, unlike cartons with tuck flaps, the paper tray and the thermoformed plastic lid when fully sealed together provide a security feature, such that the packaging cannot be opened in the store without physically damaging the packaging; this may result in reduced theft or tampering. In one embodiment, the seal between the plastic blister and paper tray components is continuous and encircles the combined volume of the container; however the seal may also be formed at points or segments along the overlap of peripheral edges between the plastic blister and paper tray components.

Variations to the above-described embodiments are also possible. For example, some embodiments may include inserts within the packaging made of paperboard to help hold a product in place. In other embodiments, rather than sealing a paper tray to a thermoformed plastic cover, it may be preferable in certain applications to seal one paper tray to another paper tray, thus resulting in a packaging container made wholly of recyclable paperboard. Furthermore, with more printable paperboard surfaces available than in a flat paperboard card as in conventional blister packaging, the aesthetics of the packaging may be improved by adding graphics with embossing, foil stamping, or lamination. In still further embodiments, RFID, Checkpoint, or Sensormatic tags may be applied to the paperboard blank during the printing production process to add an addition level of security to the packaging. Finally, various paper board tray embodiments may be adapted for assembly by the customer. In these embodiments, locking panels may be provided for the initial inter-connection between components. Thus, the tray assembly may be done merely by folding interlocking flaps, yet sealing at the peripheral flanges creates a package that will evidence any attempt to remove the product contained, even though some flaps in the tray are not glued or sealed to each other.

Figure 6A:
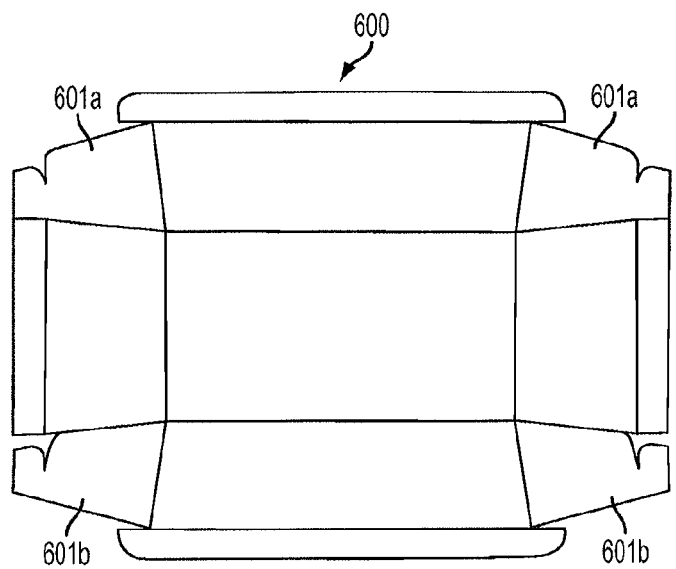
FIG. 6A is a plan view of a blank for a paperboard tray with a manual locking configuration in accordance with one embodiment.
Figure 6B:
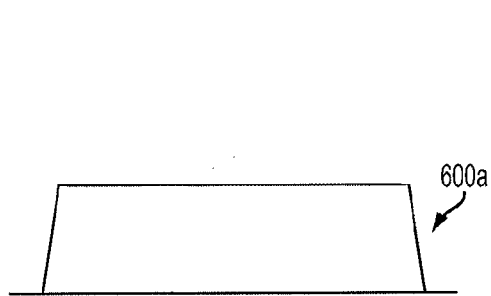
FIG. 6B is a side view of a paperboard tray having a generally rectangular box configuration, manually assembled from a blank as in FIG. 6A.
Figure 6C:
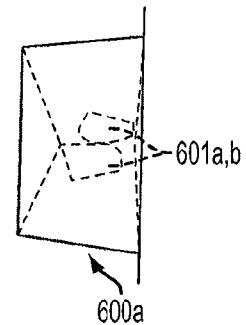
FIG. 6C is an end view of a paperboard tray manually assembled from a blank as in FIG. 6A
Figure 6D:
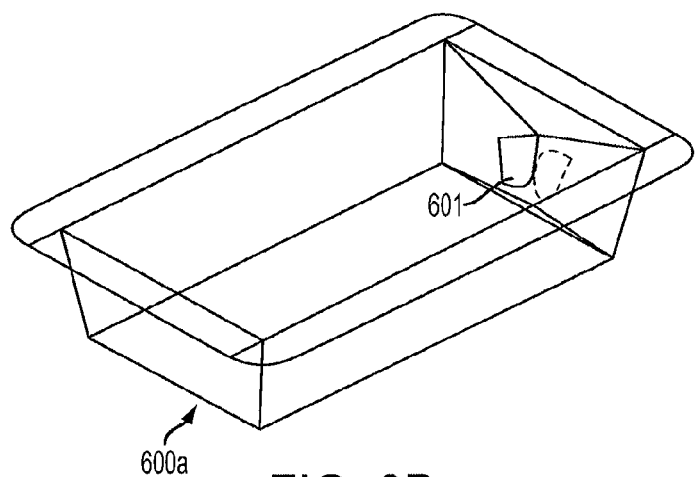
FIG. 6D is a transparent, perspective view of a manually assembled paperboard tray as in FIG. 6A.

FIGS. 6A-6D depict a further example embodiment of a paperboard tray formed from blank 600, here having interlocking end flaps 601a, 601b As shown in FIGS. 6C-6D, the interlocking end flaps 601a, 601b, have tabs and cuts that permit the opposed ends of flaps 601a, 601b to be locked when the tray 600a is erected. This embodiment permits a tray 600a to be assembled manually, with no heat sealing equipment required for that step. The manually assembled tray 600a then becomes an input component for equipment that seals a plastic blister to the tray flange, as seen in the completed containers of FIG. 1H or 2B "Vertical" Sealing Surface Package.

In some applications it may be desirable to reorient the flanges that in the embodiments discussed above extend from the edges of the plastic blister and paperboard tray and that form the surfaces at which the plastic blister and paperboard tray are joined. As seen in the container as oriented in FIG. 2B, for example, the flanges 212 and 282, when joined, lie in a horizontal plane. This plane is generally perpendicular to an axis defining the depth of the respective volumes in the plastic blister and paperboard tray (see axes A1, A2 in FIG. 2B).

Thus, we may refer to the reoriented sealing surfaces as "vertical" (i.e., generally parallel to an axis defining the depth of the respective volumes in the plastic blister and paperboard tray), although the orientation as horizontal or vertical is relative and depends on how the package is positioned. As seen in FIGS. 5A-5D the reoriented sealing surfaces become possible if the paperboard tray 500 and plastic blister 550 are configured so that each has a peripheral joining strip or surface 518, 558, respectively, that is generally perpendicular to the plane J (see FIG. 5C) of joining of the two components in the horizontal-flange version of the container discussed above and generally parallel to an axis defining the depth of the respective volumes in the plastic blister and paperboard tray. These surfaces 518, 558 can be heat-sealed at an overlap of the two respective, peripheral joining surfaces 518, 558. As seen in FIG. 5D, this results in a flat, stand-up base on which this wedge container may rest upright.

To make the overlap sealable, the plastic blister 550 has an upturned outer edge with an alignment lip 559 that may be part of a recessed peripheral sealing trough channel 570 (see FIG. 5C). The plastic blister 550 is inserted to mate within the corresponding outer edge of the paperboard tray 500, in somewhat the manner of a recessed lid of a plastic sour cream carton. (In the side and end views of FIGS. 5A and 5C, the sealing surface 558 of plastic blister 550 is inserted within the mating surface 518 of the paperboard tray 500 (typically bearing heat seal coating). Heat and pressure may then be applied by tooling that approaches the overlap of the joining surfaces 518, 558 from opposite sides to form the heat seal or other means for joining. FIG. 5A shows schematically with opposed arrows 540 how heat elements (not shown here; see FIGS. 14A-14C below) may approach the container's overlap sealing area. The sealing heat and pressure would typically be provided at all points where the surfaces 518, 558 are in contact, so that the means for sealing would be at a narrow, roughly rectangular strip that follows the circumference of the container.

Inboard Sealing at Flanges.

Figure 13A:
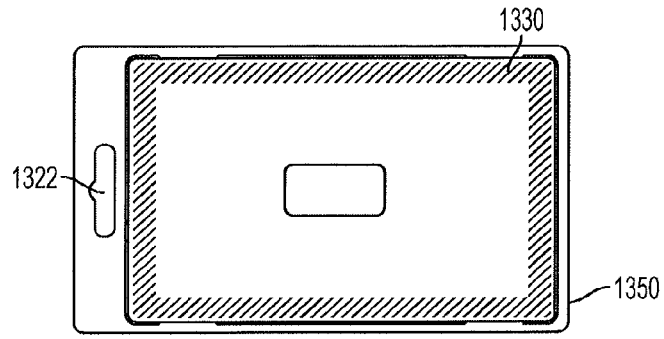
FIGS. 13A-13B depict a top and a side view, respectively, of a plastic blister for a container in which the sealing surface is recessed from the periphery of the finished container.
Figure 13B:
Figure 13C:
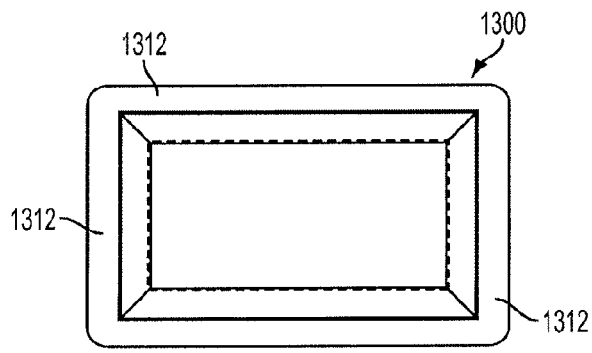
FIGS. 13C-13D depict a top and a side view, respectively, of a paperboard tray with a sealing surface at its periphery for joining with the plastic blister of FIGS. 13A-13B.
Figure 13D:
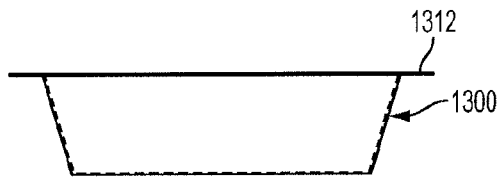
Figure 13E:
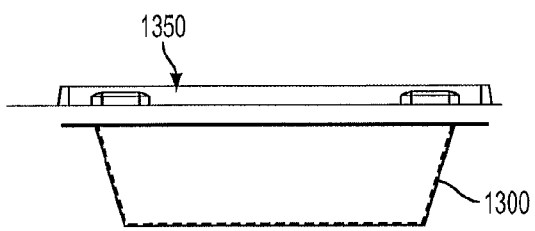
FIG. 13E depicts a side view of the paperboard tray with a sealing surface at its periphery, in position for joining with the plastic blister of FIGS. 13A-13B.
Figure 13F:
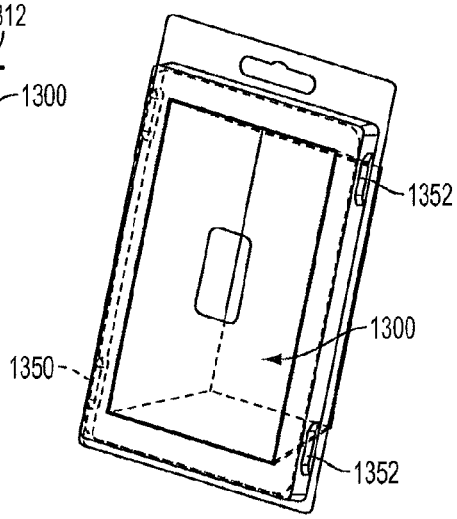
FIG. 13F depicts a transparent pictorial view of the package of FIG. 13E after joining of the blister and tray.

FIGS. 13A-13F show a further variation on the sealing surfaces for a container using a plastic blister 1350 and a paperboard tray 1300. Here, as seen in FIGS. 13A-13B, 13E, instead of the plastic blister 1350 and a paperboard tray 1300 joining at a peripheral edge that is for each its outermost edge, the plastic blister 1350 has a peripheral sealing surface 1330 (shaded or hatched areas of FIG. 13A that are inwardly recessed from the outer edge of the plastic blister 1350). The plastic blister 1350 thus has its sealing surface 1330 inboard of its outer edge, and this area of the plastic blister 1350 is to be mated with the peripheral edge formed by the rectangular flange 1312 of the paperboard tray 1300. In this embodiment, the plastic blister 1350 also has a hanger opening 1322. As seen in FIGS. 13C-13D, the flange 1312 of tray 1300 is sized to fit with the rectangle 1330 of the sealing area.

To aid in the packaging process, the plastic blister 1350 may have a down-turned lip and optionally have a plurality of indents 1352 (four in the embodiment shown in FIGS. 13E-13F) that are deformable. These may serve as latches to hold the plastic blister 1350 onto the peripheral edge 1312 of the paperboard tray 1300 before it is sealed. Thus, if a party using the container as shown on FIG. 13A-13F wishes to fill the container manually, the product can be placed in an open tray and the plastic blister 1350 then pushed down so that the indents 1352 grip under the peripheral edge 1312 of the paperboard tray 1300 as in FIG. 13F. This allows the unsealed package to be easily handled prior to sealing, with reduced concern about spilling the contents.

As seen at FIG. 13E, with or without indents 1352 the plastic blister 1350 is applied as a cover for the tray 1300. Once the plastic blister 1350 is pressed down on the tray 1300, so that the sealing area 1330 is against the flange 1312, a heat and pressure arrangement applied in a horizontal plane, much as shown in FIGS. 4A-4C, may be used to form a heat seal. Here is it only necessary that the gasket such as shown at 412 in FIG. 4C accommodate the down-turned lip (with any indents 1352), while the heat and pressure are being applied at the sealing surface 1330 and the flange 1312 immediately below it. While the indents 1352 can help ensure alignment of the surfaces to be sealed, this can also be accomplished by pins, such as those at 416 of FIG. 4A, which position the plastic blister 1350, while the tray 1300 is held in position by its placement in the opening in a plate corresponding to plate 410 in FIG. 4B.

Other Alternative Embodiments

The containers as described above may be adapted to provide other container configurations with a contained volume that may better suit certain product types or shapes. For example, a wedge-shaped paper tray as in FIGS. 1B-1D may be teamed with a plastic blister cover that may encompass little volume or even be a flat surface. As seen in FIG. 8A, in one embodiment a wedge-shaped paperboard tray 800 with a peripheral flange 802 may be joined with a plastic blister 810 that is a substantially flat, transparent surface. In one form, the flat plastic blister may have limited concave features, such as ribs to strengthen it or to provide aesthetic features, such as framing for a contained product or a geometric design.

Figure 8B:
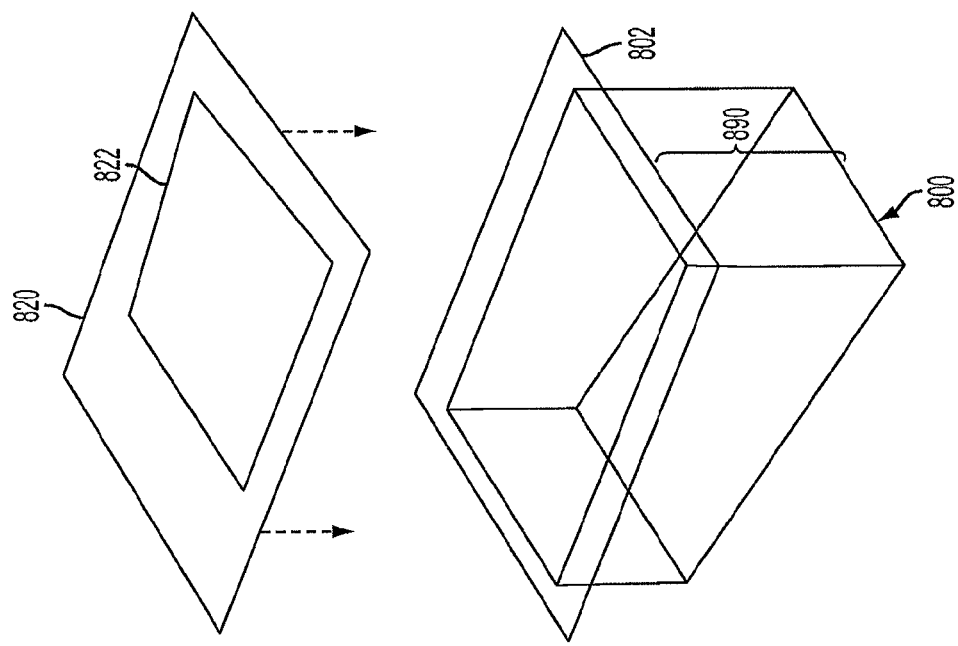
FIG. 8B depicts an exploded transparent, perspective view of an alternative blister packaging in accordance with one embodiment wherein a flat paperboard cover with a window is provided in place of a flat plastic blister cover.
Figure 8A:
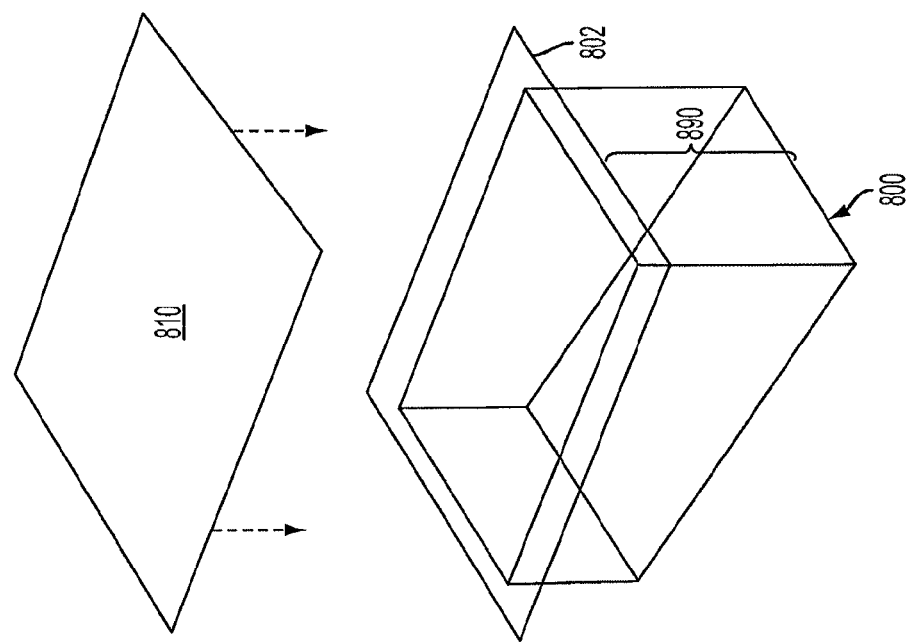
FIG. 8A depicts an exploded transparent, perspective view of an alternative blister packaging in accordance with one embodiment wherein the blister component mating to cover a wedge tray is generally flat.

In a further alternative, as seen in FIG. 8B, the peripheral flange 802 may be joined with a paperboard card cover 820 that contains a transparent plastic window 822. Such a package may increase the percentage of easily recyclable paperboard material in the container, while still affording some view of the contents, which may be highly desirable to permit a purchaser to see directly key product features, such as an electrical connector that must be compatible. As a still further alternative, where it is desired to protect the contained product from light, the plastic blister 810 that seals the wedge package may be replaced by either a flat sheet of paperboard or by a paperboard tray similar to the tray 800, serving as a package cover component for the contained volume of the wedge-shaped tray. For all these covers, heat sealing material on at least one of the mated flanges permits processing of the wedge-shaped tray in tooling of the kind shown in FIGS. 4A-4C. Two cover volume type variations may be used. In one container, the cover or first volume is a concave volume, the second volume is a concave volume and the first and second volumes join to make a combined volume larger than either the first or second concave volume. In another embodiment of the container, the cover or first volume is flat or has a convex volume, the second volume is a concave volume and the first and second volumes join to make a combined volume essentially equal to or smaller than the second concave volume.

As can be understood, these various alternative paperboard wedge containers that include wedge-shaped tray 800 are processable with tooling of the kind shown in FIGS. 4A-4C and have the same stable base 890 for upright display of the container and contained product as shown at 290 in FIG. 3. Embodiments configured with a flat or substantially flat plastic blister or cover 810 may be useful when packaging a number of small items, which are loose within the container volume and that the purchaser will want to see. Unless the package is completely filled, when the wedge package is positioned to rest on the base 890, the loose items will migrate to and spread across the bottom of the package and provide a low center of gravity to aid stable display of the container on a shelf. The same, self-standing wedge container results when the plastic blister with an open-sided volume is replaced with a package cover component comprising either a flat sheet of paperboard or a second paperboard tray with a wedge shape. Even when such a package is filled, the wedge shape provides a center of gravity below the midpoint of the height of the container when resting on base 890.

Sandwiched Plastic Blister Package.

Figure 9A:
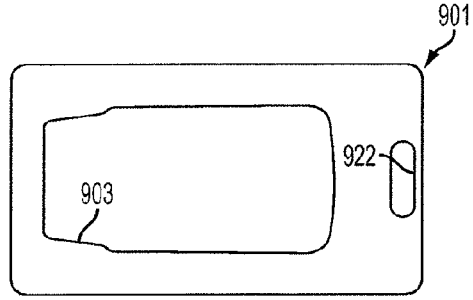
FIG. 9A depicts a paperboard blank used to form an overlay frame for a package made from a plastic blister and a paperboard tray.
Figure 9B:
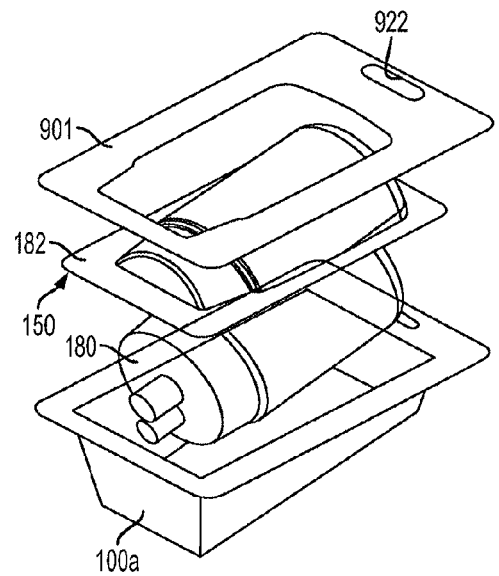
FIG. 9B depicts an exploded pictorial view of a package made from a plastic blister and a paperboard tray as in FIGS. 1B-1G with the overlay frame of FIG. 9A shown.
Figure 9C:
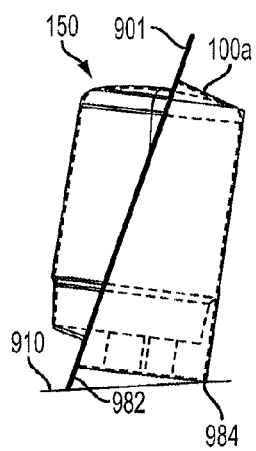
FIG. 9C depicts a side pictorial view of a package made from a plastic blister and a paperboard tray as in FIGS. 1B-1G with the overlay frame of FIG. 9A shown in place.

FIGS. 9A-9C show a further embodiment of the container of FIGS. 1B-1G that permits a different packaging look to be obtained, in particular that permits an item visible within a plastic blister to be highlighted or framed by a printed paperboard layer that is added on top of a portion of a plastic blister. As seen in FIG. 9A-9C, a container 100a is formed with a plastic blister 150 sealed onto a paperboard tray 100a has a further layer of paperboard 901 sealed on top of the plastic blister 150.

In one variation of this embodiment, the added paperboard layer 901 is a separate component as seen in FIG. 9A that has essentially the same perimeter dimensions as the plastic blister 150 and has an opening 903 through which a portion of the plastic blister 150 protrudes or is visible. This separate frame component 901 may be formed of paperboard coated with heat seal material and, for efficient sealing, may be used in a heat sealing step when the plastic blister 150 is heat-sealed onto the paperboard tray. In some applications, the plastic blister 150 itself will not be sealed to the paperboard but is nonetheless held. This is accomplished by making the area of the circumferential flange 182 of the plastic blister 150 somewhat narrower than the corresponding circumferential flanges of the tray 100a and the frame component 901. Thus, the heat sealing step accomplishes a direct seal between the circumferential flanges of the tray 100a and the frame component 901 at the outer periphery of these flanges. Slightly inward from the outer periphery, the plastic blister 150 will be sandwiched and captured between the circumferential flange of the tray 100a and the flange of the frame component 901.

In another variation, the additional paperboard layer 901 is formed by an additional panel that extends from the lower peripheral edge of the tray. Referring to FIG. 1A, the additional, framing panel may be attached to flap 112 at a fold line along the outer edge of flap 112. The outer contour of the panel 901 is generally congruent with the peripheral edge of the erected paperboard tray. The panel 901 remains out of the way when the plastic blister 150 is applied to the peripheral edge of the paperboard tray 900 but panel 901 is then placed onto the peripheral edge of the plastic blister 950 for using heat sealing to create a bond or other means for joining.

As can be seen in FIG. 9C, this framed configuration has the same two supports for a stand-up base as in FIG. 3. That is, the sealed edge 982 forms a first support and the fold line 984 that is one of the edges of the bottom of wedge tray 100a forms the second support, allowing the container to stand stably on a support surface 910.

Convex Plastic Blister.

The fact that the paperboard tray of the present container (e.g., tray 200 of FIG. 2A) provides a second volume that cooperates with a first volume of a plastic blister (e.g., blister 250 of FIG. 2A) to which it is joined permits a further variation on the containers described above. As seen in the container in FIGS. 10A-10G, instead of the volume of the plastic blister 1050 being concave, here it has convex features and is configured with a dispenser panel 1060. Thus, the plastic blister 1050 has a peripheral flange 1052 and is joined to the paperboard tray 1000 at its flanges, but the plastic blister 1050 is formed with convex volumes that subtract from the volume 1010 enclosed by the paperboard tray 1000 and with other functional features that enhance the value of the container.

Figure 10A:
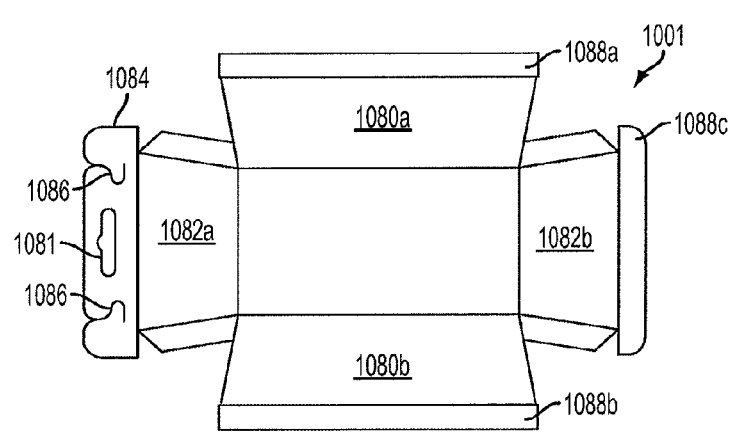
FIG. 10A is a plan view of a paperboard blank for an alternative blister container in accordance with one embodiment, where the plastic blister component is convex and has a hinge feature to facilitate a dispenser opening
Figure 10B:
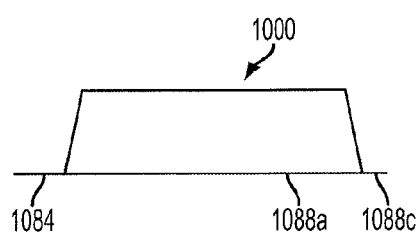
FIGS. 10B-10C depict side and end views, respectively, of the paperboard tray for an alternative blister container in accordance with one embodiment, made with the paperboard blank of FIG. 10A.
Figure 10C:
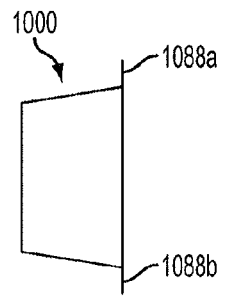

FIG. 10A shows a paperboard blank 1001 for forming the tray 1000. It has two side panels 1080a, 1080b, each with a corresponding outer panel 1088a, 1088b, respectively, that becomes part of the peripheral flange of the tray 1000. The blank 1001 also has two end panels, 1082a and 1082b. Panel 1082b has a corresponding outer panel 1088c that becomes part of the peripheral flange of the tray 1000. Panel 1082a has a corresponding outer panel 1084 that has a pair of tab cuts 1086, 1086 on either side of a hanger opening 1081. The inner portion of panel 1084 becomes part of the peripheral flange of the tray 1000. As will be further explained, tab cuts 1086, 1086 become part of a re-closable dispenser opening. FIGS. 10B-10C show blank 1001 after it is erected, using the same type of corner seal flaps as shown in FIGS. 1A-1B. In particular, FIGS. 10B-10C show how panels 1088a, 1088b, 1088c and 1084 provide the circumferential flange for attachment of blister 1050.

Figure 10D:
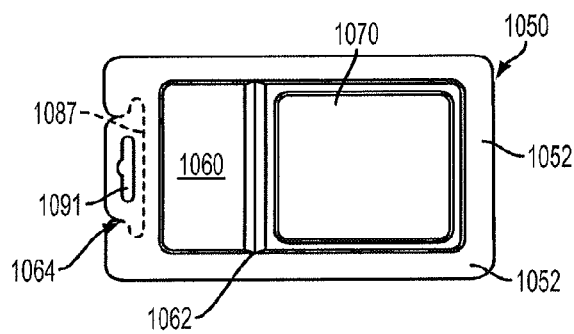
FIG. 10D is a plan view of the plastic blister component for the alternative blister container in accordance with one embodiment, where the blister is convex and has a hinge feature to facilitate a dispenser opening
Figure 10E:
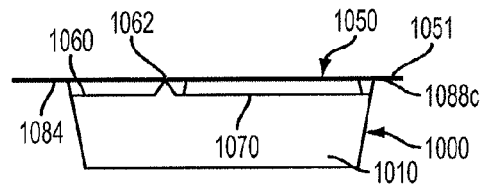
FIGS. 10E-10F depict side and end views, respectively, of the paperboard tray made with the paperboard blank of FIG. 10A and the plastic blister of FIG. 10D, assembled to make the alternative blister container.
Figure 10F:
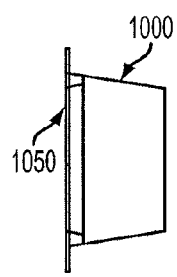
Figure 10G:
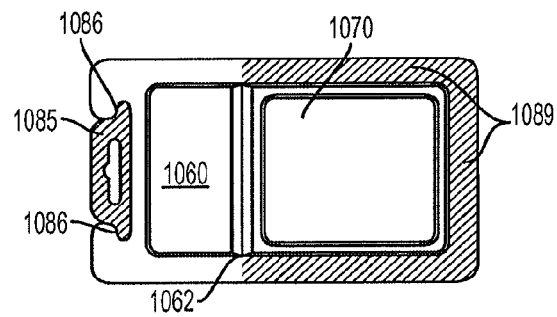
FIG. 10G is a plan view of the alternative blister container made with the paperboard tray of FIGS. 10B-10C and the plastic blister of FIG. 10D, assembled to make the alternative blister container and showing the areas of the peripheral flanges of the paperboard tray of FIGS. 10B-10C and the plastic blister of FIG. 10D at which they are mated and sealed together.

FIG. 10D shows in plan the plastic blister 1050 and the features that help form a dispenser container, after plastic blister 1050 is joined with tray 1000 as shown in FIG. 10E. In particular, the plastic blister 1050 has viewing panel 1070 recessed into the paperboard tray 1000 and joined at a V-shaped ridge 1062 with a similarly-recessed dispenser panel 1060. Plastic blister 1050 also has tab cuts 1064 that lead to a perforated cut 1087 adjacent a hanger opening 1091. Plastic blister 1050 has its features sized and located so that it may be attached to the peripheral flange panels 1088a, 1088b, 1088c and 1084 of tray 1000, such that tab cuts 1064 overlie tab cuts 1086 of the tray 1000 and hanger openings 1081, 1091 coincide. Unlike other embodiments discussed above where sealing of a plastic blister to a paperboard tray flange is typically continuous around the circumference of these components, in this container, the sealing may occur only at the shaded overlap areas of FIG. 10G, including u-shaped area 1089 and tab cut area 1085. This can be effected by applying sealing heat and/or heat seal coating only in the areas indicated by shading.

After sealing at the areas 1089 and 1085, the container is effectively closed; however, the lack of sealing in the two unsealed areas on either side of the dispenser panel 1060 permits a purchaser to free the dispenser panel 1060 to hinge at ridge 1062 by breaking the hang tab portion of the plastic blister free from the rest of the blister (the break is at tab cuts 1064 and perforated cut 1087). The hang tab portion of the plastic blister remains sealed to the paperboard tray panel 1084. The overlapping/interfering flaps on the plastic blister and the tray panel where the hang tab portion of the plastic blister remains sealed form a re-closable lock. The dispenser panel 1060 can hinge open at ridge 1062 and then be pressed back down to lock against the edges of its separated portion, still sealed to the paperboard tray panel 1084.

While shown with a uniform depth in FIGS. 10A-10B, the paperboard tray 1000 may equally well be in the form of the wedge-shaped trays described above, e.g., FIGS. 1B-1D, to provide a more stable base. Such a wedge-shaped container with a dispenser panel 1060 may be particularly suited for containing and, after opening, dispensing from an upright position on its base, screws or other small hardware items that maybe packaged in such a container.

Manufacturing Equipment and Methods.

Figure 11A:
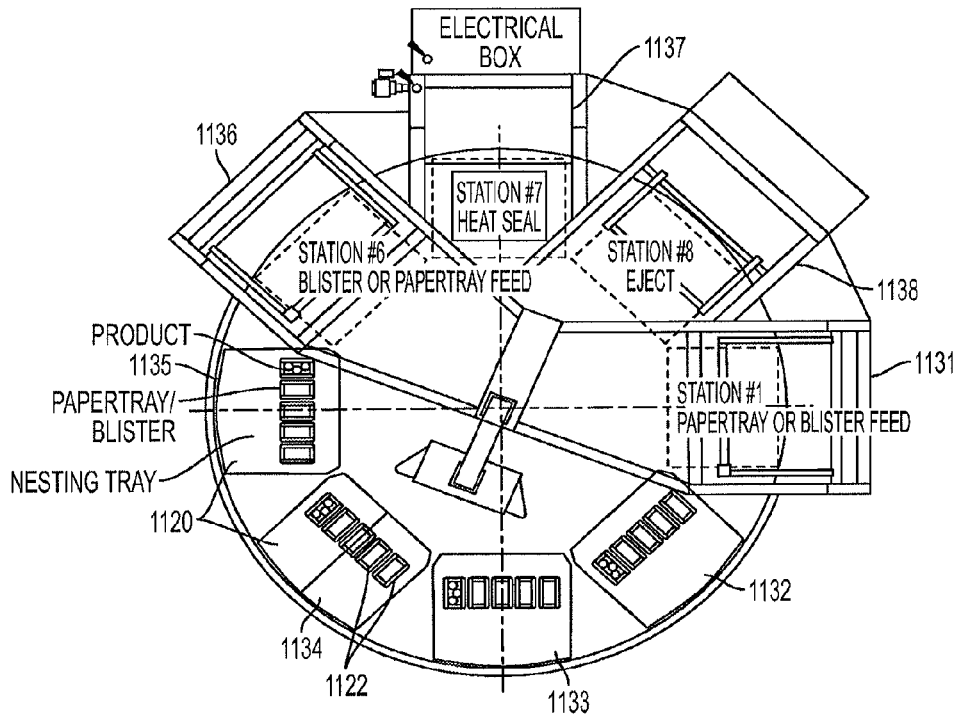
FIGS. 11A-11B depict schematic plan and cross-section views, respectively, of conventional plastic blister package filling and sealing equipment with tooling adaptable for the containers described herein.
Figure 11B:
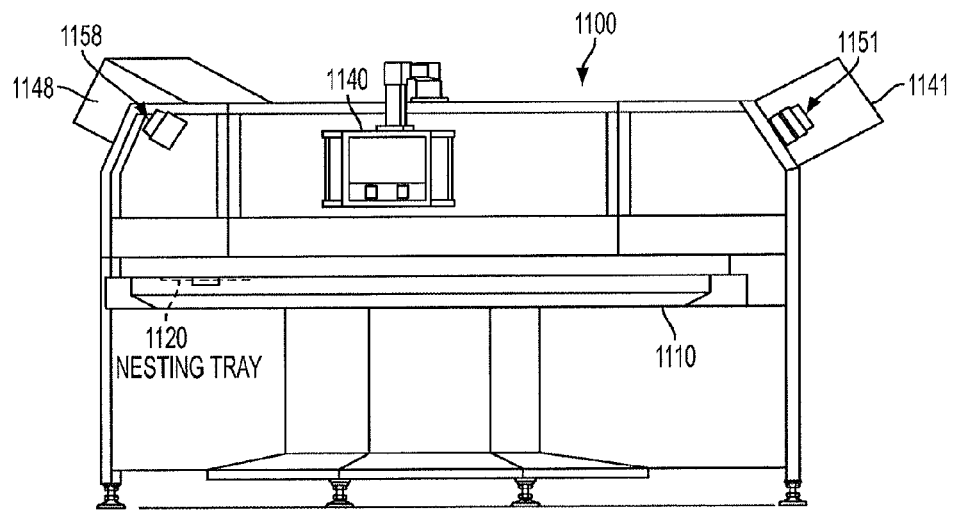
Figure 12A:
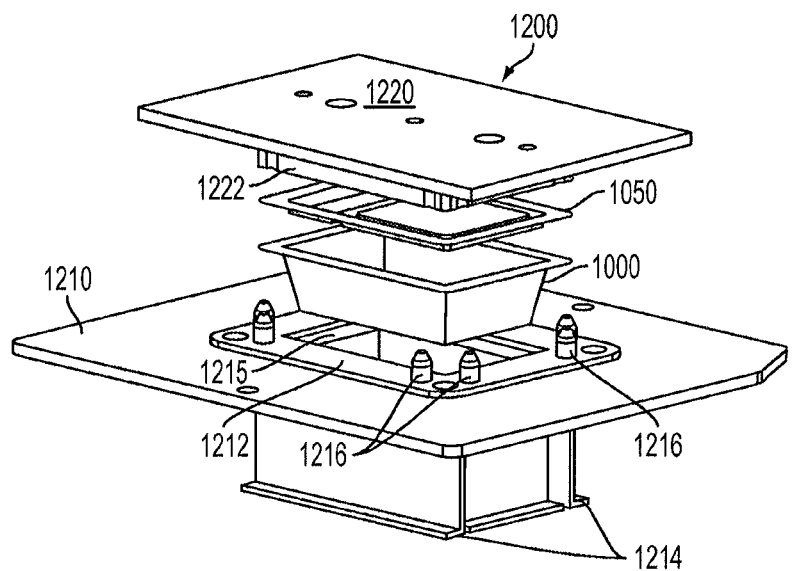
FIGS. 12A-12C depict an exploded perspective view and related plan and cross-sectional (taken along line B-B of FIG. 12B) views, respectively, of tooling used with equipment as in FIGS. 11A-11B for holding and sealing components for a container as shown in FIGS. 10B-10G.
Figure 12B:
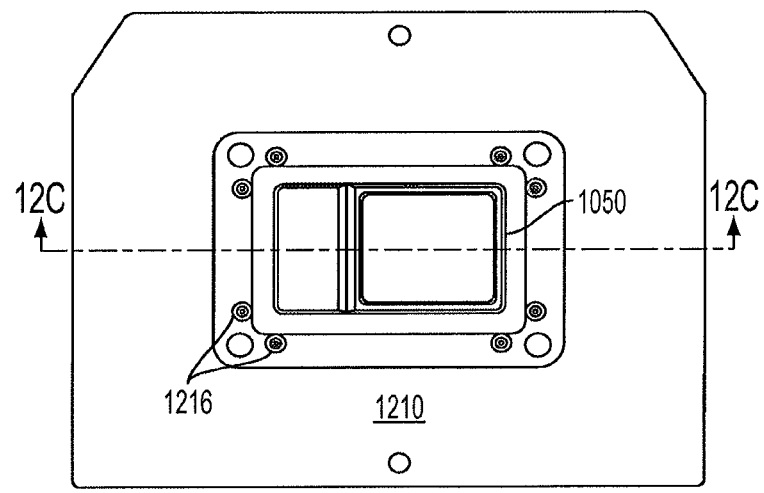
Figure 12C:
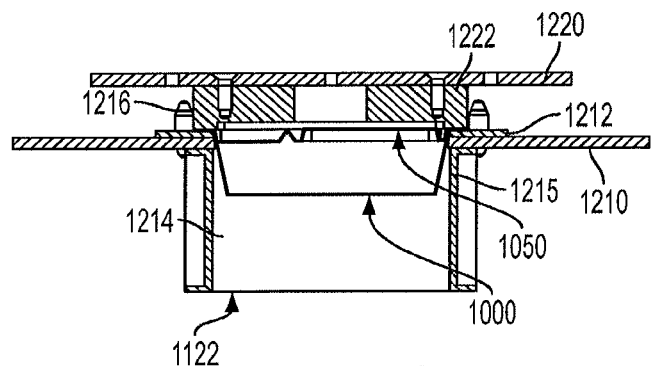

FIGS. 11A-11B show a conventional packaging filling and sealing machine in which the containers as described above in various embodiments may be processed, such as the Aergo 8 machine from Tegrant Corporation, Alloyd Brands of DeKalb, Ill. or a similar machine. FIGS. 12A-12C show a set of tooling that, by way of example, is specifically adapted to permit the container of FIGS. 10A-10C to be filled and sealed on the Aergo 8 or a similar machine. As seen in FIGS. 11A-11B, the packaging machine has a rotating turntable 1110 that has eight container-nesting trays 1120. Each of these trays has multiple (in this example, five) nests 1122 into which tooling may be inserted to adapt the machine to load and seal a particular container as described above. The turntable 1110 is rotatable, so that each nesting tray 1120 can be positioned at each of eight workstations. These workstations are as follows:

Station 1—Paper tray, plastic blister, flat card or flat plastic component feed 1131

Stations 2-5—Product insertion 1132-1135

Station 6—Paper tray, plastic blister, flat card or flat plastic component feed (counterpart to component fed at Station 1) 1136

Station 7—Heat sealing 1137

Station 8—Ejecting filled, sealed containers 1138

Station 1 1131 has a feed magazine 1141 that holds a stack of paper trays or plastic blisters 1151, and provides singulation and feeding down individual components to fit into one of the nests 1122. Station 6 has a feed magazine 1148 that holds a stack of plastic blisters or paper trays 1158 for singulation and feeding down to fit onto paper trays or plastic blisters filled and resting in one of the nests 1122. An equipment display/control unit 1140 is located above the product insertion stations 1132-1135.

FIG. 12A shows an exploded view of the tooling that goes into a nesting cavity for filling and sealing a container of the type shown in FIGS. 10A-10C. FIG. 12A shows the plastic blister 1050 placed above the paper tray 1000 so that its peripheral flange is aligned with that of the paper tray 1000. Above the plastic blister 1050 is the heating plate 1220. FIG. 12B shows a plan view of the stack of elements in FIG. 12A with the heating plate 1220 removed and the paper tray 1000 and plastic blister 1050 resting in the chamber or nest 1122.

FIG. 12C shows a cross-section (taken along line B-B in FIG. 12B) of the stack of elements in the exploded view of FIG. 12A. Paper tray 1000 rests in nest 1122 surrounded by rubber pad 1212 on plate 1210. Plastic blister 1050 has been placed on paper tray 1000 for sealing. (For clarity, no inserted product is shown in FIG. 12C.) A heating tool assembly is also part of the tooling. Heating plate 1220 is shown bringing heat blocks 1222 into contact with the peripheral edge of the plastic blister 1050 and applying pressure and heat on the joined peripheral edges of paper tray 1000 and plastic blister 1050, pressing them against rubber pad 1212.

Referring back to FIGS. 11A-11B, a package filling and assembly process can be explained, which assumes that the machine 1100 has a supply of already erected paperboard trays 1000 bearing the desired printed labels, instructions etc. For example, there may be a nested stack of such trays 1000 at workstation 1131. A tray 1000 is singulated from the stack and transported to one of the nests 1122 of a nesting tray 1120. Product insertion occurs at least one of insertion stations 1132-1135, where there is a supply of products (not shown) to be placed (by workers or automated equipment) in each tray 1000. The filled trays then proceed to station 1136 where there is a supply 1158 of plastic blisters. A singulated blister 1050 delivered to nest 1122 is positioned so that its peripheral flange is mated with the corresponding portions of the peripheral flange of tray 1000 (see FIG. 12C). The corner pins 1216 help align and hold in alignment the blister 1050.

The mated paperboard tray 1000 and plastic blister 1050 then rotate to station 1137. Heat or some other form of energy that will activate or cure the heat seal coating at the mated peripheral edges is applied by heating plate 1220 for the necessary dwell time to form a sufficient bond for joining the peripheral edges. This sealing action will depend on the type of bond formed, its desired strength, permeability, peelability or other qualities. (Often the joining of the plastic blister to a paperboard tray will be faster than clamshell sealing.) The sealed container is then rotated to station 1138, where it is ejected. This permits a fresh paperboard tray 1000 to be fed into the nest 1122 and the next set of paperboard trays 1000 proceeds to be loaded and sealed.

Figure 2B:
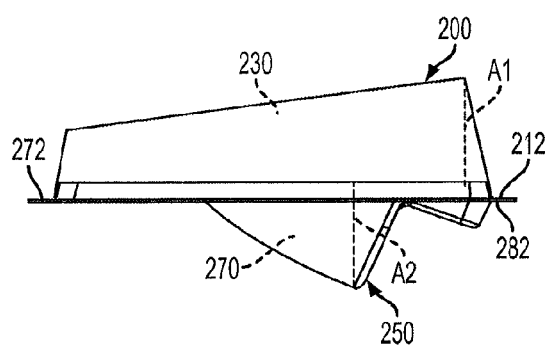
FIG. 2B is a side view of the blister packaging container of FIG. 2A.
Figure 2C:
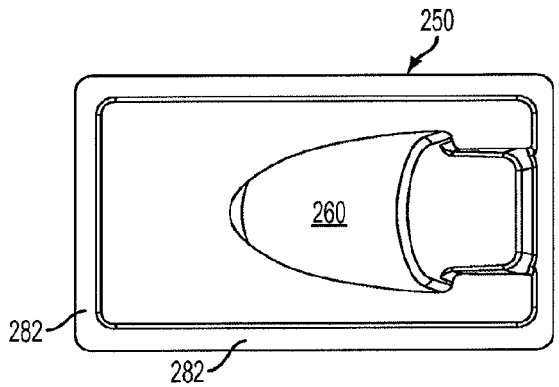
FIG. 2C is a plan view of the blister packaging container of FIG. 2A.
Figure 2D:
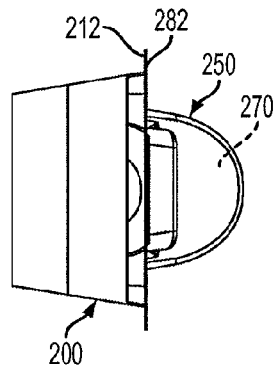
FIG. 2D is an end view of the blister packaging container of FIG. 2A.

As can be seen, the tooling of FIGS. 12A-12C can work equally well when a wedge-shaped paperboard tray as shown FIGS. 2A-2B is placed in a nest 1122 in place of a tray of even depth as in FIGS. 10A-10C. The only necessary change may be in the tray feeding mechanism. Further, with a minor change in the heating plate 1220 to add headroom, a plastic blister that defines a concave space as shown in FIGS. 2A-2B and 4A-4B can be accommodated for sealing.

In alternative container embodiments, the peripheral flanges of each of the plastic blister and the paperboard tray may be defined by two planes, the first plane joining the second plane at two step segments on opposite sides of the peripheral flange. Such a bi-planar flange embodiment may facilitate the packaging of certain products having an irregular shape. The tooling shown in FIGS. 12A-12C can be adapted to accommodate joining peripheral edges in two planes (or, more generally, multiple planes) with corresponding step up and/or down segments in the rubber pad 1212 and in the heating blocks 1222. Thus, the planar peripheral edges of the containers may technically subsume more than one plane when the edges are stepped, while remaining generally sealed in a common planar region.

The package of FIGS. 5A-5D requires somewhat different tooling than that shown in FIGS. 12A-12C, in view of the fact that the plastic blister and paper tray are not joined by two sets of parallel flanges that are brought together and sealed in a single, flat plane that is generally perpendicular to an axis defining the depth of the respective volumes in the plastic blister and paperboard tray (see axes A1, A2 in FIG. 2B). The flanges where joining of the plastic blister and paper tray of FIGS. 1A-1-H occurs are "horizontal", while the package of FIGS. 5A-5D has joining surfaces that are "vertical". Here the plane of sealing is not a single, flat plane, but rather sealing occurs at a narrow strip of aligned, overlapping "vertical" edges that follows the circumference where the plastic blister and paper tray are joined.

FIG. 14A shows an exploded view of the tooling that goes into a nesting tray for filling and sealing a container of the type shown in FIGS. 5A-5D. FIG. 14A shows the paper tray 500 placed above the plastic blister 550 so that its peripheral "vertical" sealing edge is aligned for overlap with the corresponding peripheral "vertical" sealing edge of the plastic blister 550. Above the paper tray 500 is the plate 1420 with the heating elements 1422. FIG. 14B shows a plan view of the stack of elements in FIG. 14A with the heating plate 1420 removed and the paper tray 500 resting on plastic blister 550 (not visible) in the chamber or nest 1122.

FIG. 14C shows a cross-section (taken along line B-B in FIG. 14B) of the stack of elements in the exploded view of FIG. 14A. Plastic blister 550 rests in nest 1122 surrounded and supported by extensions of plate 1410 that include a beveled insert 1416 that mates with a corresponding taper at the lower, inner edge of the heating elements 1422. Paper tray 500 has been placed on plastic blister 550 for sealing. (For clarity, no inserted product is shown in FIG. 14C.) Heating plate 1420 is shown bringing heat blocks 1422 into contact with the peripheral edge 518 of the paper tray 500 where that edge is aligned with and overlaps with a corresponding edge 558 of the plastic blister 550. (See also FIGS. 5A-5D.) The heating blocks 1422 apply pressure and heat on the aligned, overlapped peripheral edges 518, 558 of paper tray 500 and plastic blister 550, pressing them against insert 1416. This corresponds to the opposed forces shown at 540 in FIG. 5A.

FIGS. 14A-14C show not only how the "vertical" sealing edges may be handled by the tooling but also how the plastic blister may be placed first, open upward, then filled with product. The paper wedge tray is then accommodated in the tooling components that descend on the nested, filled plastic tray for sealing. This is the reverse of other embodiments shown with the paper tray placed first for filling.

Although the present disclosure has been described with reference to various embodiments, persons skilled in the art will recognize that changes may be made in form and detail without departing from the spirit and scope of the invention.

What is claimed is:

1. A container comprising:
   a transparent cover component with a first peripheral surface comprising an upturned outer edge defining a plurality of sealing surfaces and a first, open-sided volume extending from the first peripheral surface;
   a paperboard tray component with a second peripheral surface defining a plurality of mating surfaces configured for joining in overlapping alignment with the plurality of sealing surfaces of the first peripheral surface of said transparent cover component inserted within the mating surfaces of the paperboard tray component, and a second, open-sided volume extending from the second peripheral surface, the plurality of sealing surfaces and the plurality of mating surfaces of the overlapping peripheral surfaces being oriented generally parallel to an axis defining the depth of the paperboard tray component, generally perpendicular to a bottom of the paperboard tray component; and
   a sealing strip oriented generally parallel to the axis defining the depth of the paperboard tray component and forming a bond for joining the plurality of sealing surfaces of the first peripheral surface of the transparent cover component along a circumferential overlap with the plurality of mating surfaces of the second peripheral surface of the paperboard tray component, the sealing strip bonding the mating and sealing surfaces along a strip of aligned, overlapping edges following the circumferential overlap of the first and second peripheral surfaces and oriented generally parallel to the axis defining the depth of the paperboard tray component, wherein the transparent cover component and the paperboard tray component are joined to form an enclosed volume of the container, absent sealing or bonding extending from the circumferential overlap in a plane generally perpendicular to the axis defining the depth of the paperboard tray component.

2. The container of claim 1 wherein the sealing strip is selected from the group consisting of: a heat seal strip, a radio frequency weld, an ultrasonic weld, glue or an adhesive.

3. The container of claim 1 wherein the sealing strip comprises a circumferential seal substantially continuous along the overlapping peripheral surfaces, absent peripheral flanges extending in a plane generally perpendicular to the axis defining the depth of the paperboard tray component.

4. The container of claim 1 wherein the sealing strip comprises a heat-activated sealing material applied to the paperboard tray component and activated at the overlapping peripheral surfaces.

5. The container of claim 1 wherein the sealing strip is substantially continuous along the overlapping peripheral surfaces, absent peripheral flanges extending in plane generally perpendicular to the axis defining the depth of the paperboard tray component.

6. The container of claim 1 wherein the sealing strip is discontinuous along the overlapping peripheral surfaces.

7. A container comprising:
   a transparent cover component having a first peripheral edge comprising an outer edge defined along a plurality of sealing surfaces and an open-sided volume extending from the first peripheral edge;
   a paperboard tray component having a second peripheral edge defined along a plurality of mating surfaces, each of the sealing surfaces of the first peripheral edge and mating surfaces of the second peripheral edge oriented generally along an axis defining a depth of the paperboard tray component, generally transverse to a bottom of the paperboard tray component; and
   a sealing strip oriented generally along the axis defining the depth of the paperboard tray component, the sealing strip forming a bond for joining an interior of the second peripheral edge as defined along the plurality of mating surfaces of the paperboard tray component at a circumferential overlap with an exterior of the first peripheral edge as defined along the plurality of sealing surfaces of the transparent cover component inserted within the paperboard tray component, the sealing strip bonding the sealing and mating surfaces along a strip of aligned, overlapping edges following the circumferential overlap of the first and second peripheral edges and oriented generally parallel to the axis defining the depth of the paperboard tray component, wherein the transparent cover and paperboard tray components are joined to form an enclosed volume of the container, absent sealing or bonding extending from the enclosed volume along peripheral flanges in a plane generally perpendicular to the axis defining the depth of the paperboard tray component.

8. The container of claim 7, wherein the transparent cover component comprises a plastic blister without a peripheral flange.

9. The container of claim 8, wherein the paperboard tray component comprises a wedge-shaped paperboard tray without a peripheral flange.

10. The container of claim 7, wherein the transparent cover component comprises a plastic blister and the paperboard tray component comprises a wedge-shaped paperboard tray with a second open-sided volume having greater depth at one end than at another end for positioning in overlapping alignment with the first peripheral edge of transparent cover component, absent flanges extending in the plane generally perpendicular to the axis defining the depth of the paperboard tray component.

11. The container of claim 7, wherein the sealing strip comprises a heat-activated sealing material applied to the paperboard tray component and activated at the circumferential overlap of the first and second peripheral edges.

12. The container of claim 7, wherein the paperboard tray component comprises a paper-based tray without a peripheral flange.

13. The container of claim 7, wherein the paperboard tray component has a second, open-sided volume extending from the first peripheral surface and the sealing strip comprises a continuous perimeter seal forming a bond along substantially an entire length of the overlapping peripheral edges of the transparent cover and paperboard tray components, such that the container encloses the joined first and second open-sided volumes.

14. The container of claim 7, wherein the transparent cover component comprises a plastic blister with a circumferential channel, the first peripheral edge comprises an exterior wall of the circumferential channel absent a peripheral flange, and the sealing strip joins an interior of the second peripheral edge in overlap with the exterior wall of the channel.

15. The container of claim 7, wherein the transparent cover component has an alignment lip at an edge of an exterior wall, the alignment lip configured to aid in mating alignment of the first and second peripheral edges.

16. The container of claim 15, wherein the paperboard tray component has a second, open-sided volume absent a peripheral flange and the circumferential channel of the transparent cover component is received as an insertion within the second, open-sided volume of the paperboard tray component, with an insertion depth determined by the alignment lip of the circumferential channel of the transparent cover component.

17. A method comprising:
   providing a transparent cover component having a first peripheral edge defined along a plurality of sealing surfaces oriented generally along an axis defining a depth of the container, and a first open-sided cover volume extending from the first peripheral edge;
   providing a paperboard tray component having a second peripheral edge defined along a plurality of mating surfaces oriented generally along the axis defining the depth of the container, and a second open-sided tray volume extending from the second peripheral edge;
   inserting the sealing surfaces of the transparent cover component within the mating surfaces of the paperboard tray component, the first and second peripheral edges in mating contact with each of the mating and sealing surfaces oriented generally along the axis defining the depth of the container; and
   forming a transverse seal between the mating first and second peripheral edges, the transverse seal bonding the mating and sealing surfaces along a strip of aligned, overlapping edges following a circumferential overlap of the first and second peripheral edges, the transverse seal oriented generally along the axis defining the depth of the container and extending circumferentially along the mating and sealing surfaces to form an enclosed container by joining the transparent cover component within the paperboard tray component, absent bonding or sealing extending from the circumferential overlap in a plane generally perpendicular to the axis defining the depth of the container.

18. The method of claim 17, wherein the step of forming a seal comprises a sealing action selected from the group consisting of: activating a heat seal strip, making a radio frequency weld, making an ultrasonic weld, applying glue and applying an adhesive, absent such a sealing action between peripheral flanges extending from the circumferential overlap in the plane generally perpendicular to the axis defining the depth of the container.

19. The method of claim 17, wherein the step of forming a seal comprises forming a circumferential seal continuous along the mating and sealing surfaces of the first and second peripheral edges, absent such a seal between peripheral flanges extending from the circumferential overlap in the plane generally perpendicular to the axis defining the depth of the container.

20. The method of claim 17, wherein the step of forming a seal comprises forming a circumferential seal discontinuous along the mating and sealing surfaces of the first and second peripheral edges.

21. The container of claim 1, wherein the tray comprises a plurality of side panels extending transversely from a bottom panel without a peripheral flange, the plurality of mating surfaces defined on the plurality of side panels to extend along the peripheral surface of the tray.

22. The container of claim 21, wherein an opposing pair of the plurality of side panels are nonparallel, and wherein the mating surfaces defined on the opposing pair of nonparallel side panels are nonparallel.

23. The container of claim 7, wherein the paperboard tray component comprises a plurality of sides extending transversely from a bottom thereof, the plurality of mating surfaces defined along the plurality of sides to form the second peripheral edge of the paperboard tray component without a peripheral flange.

* * * * *